(12) United States Patent
Tsai

(10) Patent No.: US 10,081,154 B2
(45) Date of Patent: Sep. 25, 2018

(54) INTEGRATED OPEN BOX-LIKE WOVEN FABRIC

(71) Applicant: Li-Ju Tsai, Tainan (TW)

(72) Inventor: Li-Ju Tsai, Tainan (TW)

( * ) Notice: Subject to any disclaimer, the term of this patent is extended or adjusted under 35 U.S.C. 154(b) by 140 days.

(21) Appl. No.: 15/146,625

(22) Filed: May 4, 2016

(65) Prior Publication Data

US 2016/0325519 A1     Nov. 10, 2016

(30) Foreign Application Priority Data

May 6, 2015   (TW) .............................. 104114461 A

(51) Int. Cl.
| | |
|---|---|
| *B32B 1/00* | (2006.01) |
| *D03D 11/02* | (2006.01) |
| *B32B 5/02* | (2006.01) |
| *B32B 5/26* | (2006.01) |
| *D03D 1/04* | (2006.01) |
| *D03D 3/00* | (2006.01) |
| *D03D 25/00* | (2006.01) |

(52) U.S. Cl.
CPC ................ *B32B 1/00* (2013.01); *B32B 5/024* (2013.01); *B32B 5/26* (2013.01); *D03D 1/04* (2013.01); *D03D 3/00* (2013.01); *D03D 11/02* (2013.01); *D03D 25/005* (2013.01); *B32B 2250/20* (2013.01); *D03D 2700/03* (2013.01); *D10B 2505/02* (2013.01)

(58) Field of Classification Search
CPC .. B32B 1/00; B32B 5/024; B32B 5/26; B32B 2250/20; D03D 11/02; D03D 1/04; D03D 3/00; D03D 25/005; D03D 2700/03; D10B 2505/02
See application file for complete search history.

(56) References Cited

U.S. PATENT DOCUMENTS

| 4,958,663 A | 9/1990 | Miller et al. |
| 2010/0167007 A1 | 7/2010 | Goering |

FOREIGN PATENT DOCUMENTS

GB     854222 A     11/1960

OTHER PUBLICATIONS

Xiaogang Chen, et al., "An overview on fabrication of three-dimensional woven textile preforms for composites," Textile Research Journal 0(00) 1-13, Jan. 26, 2011.

*Primary Examiner* — Michael C Miggins
(74) *Attorney, Agent, or Firm* — Hamre, Schumann, Mueller & Larson, P.C.

(57) ABSTRACT

An open box-like woven fabric includes two inner walls connected transversely between two outer walls, and a base wall connected to the outer and inner walls oppositely of a top opening formed between the outer and inner walls. Each outer wall has an outwardly extending side extension, and the base wall has an outwardly extending bottom extension. The open box-like woven fabric is formed from a novel flattened fabric preform.

9 Claims, 28 Drawing Sheets

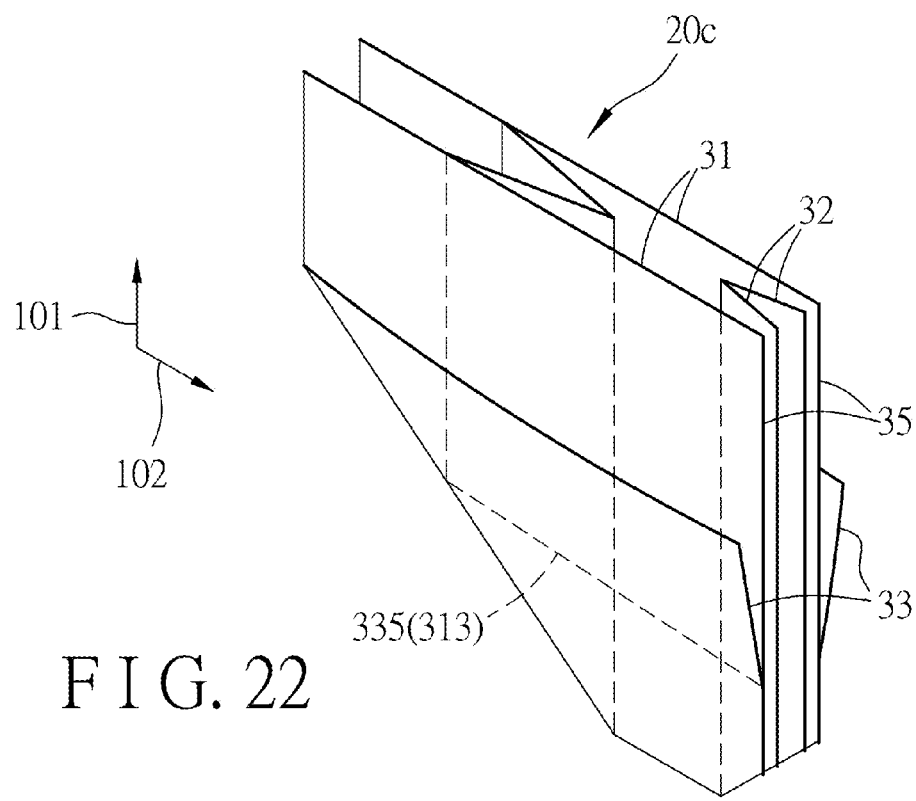
F I G. 22
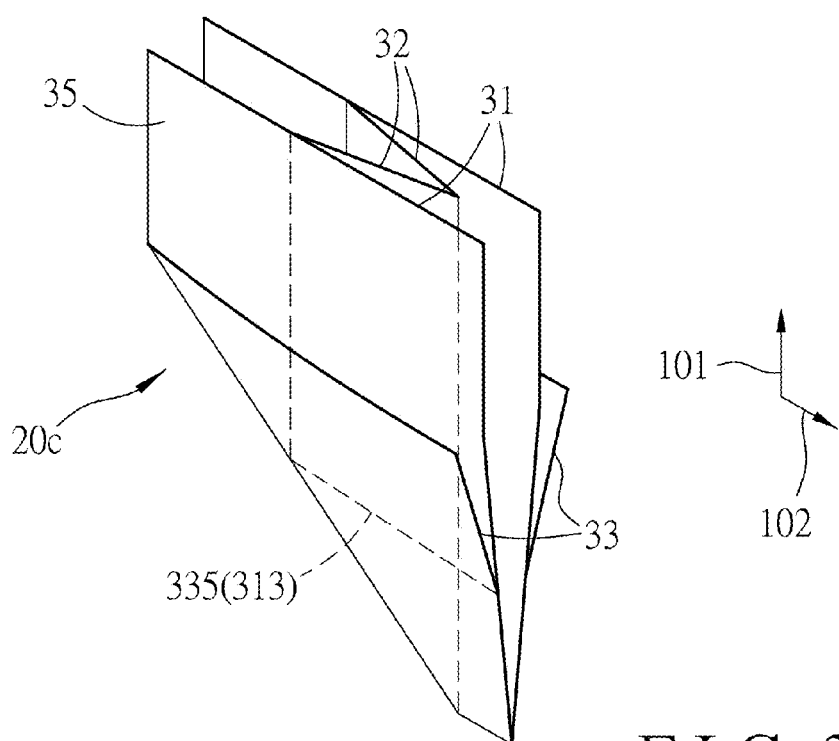
F I G. 23

INTEGRATED OPEN BOX-LIKE WOVEN FABRIC

CROSS REFERENCE TO RELATED APPLICATION

This application claims priority of Taiwanese Application Number 104114461, filed on May 6, 2015.

FIELD

The disclosure relates to a box-like structure, more particularly to an integrated open box-like woven fabric.

BACKGROUND

An open box-like woven fabric for reinforcement of many engineering structures, such as those used in aerospace and automotive industries, generally has a base wall and four side walls. A conventional open box-like woven fabric is made by individually weaving the base wall and the side walls, after which they are stitched together to form the open box-like woven fabric. However, the junction between the base wall and the corresponding side wall and the junction between each two adjacent side walls of the conventional open box-like woven fabric are weak.

In order to strengthen the structure of an open box-like woven fabric, the prior art has suggested various methods of fabricating an integrated one-piece open box-shaped reinforcement fabric using a weaving technology. Examples of the methods are disclosed in U.S. Pat. No. 4,958,663, U.S. Pat. No. 8,846,553 and GB Patent No. 854222.

SUMMARY

Therefore, an object of the present disclosure is to provide an improved integrated open box-like woven fabric that can be fabricated using the existing weaving technology.

According to one aspect of the present disclosure, an integrated open box-like woven fabric comprises an open box-like unit including two outer walls, at least two spaced-apart inner walls connected transversely between the outer walls, at least one top opening formed between the outer walls and between the at least two inner walls, and a base wall connected to the outer and inner walls oppositely of the top opening. Each outer wall has at least one side extension extending outwardly from a junction of one of the outer walls and a corresponding one of the inner walls. The base wall has at least one bottom extension extending outwardly from a junction of the base wall and the corresponding one of the inner walls. The at least one side extension of each outer wall forms one corner with the at least one bottom extension and with the corresponding one of the inner walls. The open box-like unit is formed from a flattened fabric preform, which includes a plurality of first yarns arranged at different levels, and a plurality of second yarns interwoven with the first yarns to form a plurality of fabric layers that are foldably/unfoldably connected to each other.

The fabric layers include two first fabric layers, at least one pair of second fabric layers disposed between the first fabric layers, and at least one third fabric layer disposed adjacent at least one of the first fabric layers oppositely of the second fabric layers. Each first fabric layer has two opposite first sides, two opposite second sides that respectively connect to and converge from the first sides and that respectively have converging ends opposite to the first sides, and diverging ends connected to the first sides, and a third side connected between the converging ends of the second sides. The at least one third fabric layer has two opposite fourth sides, that respectively have converging ends and diverging ends, and that are connected to the at least one of the first fabric layers. Each second fabric layer has two opposite fifth sides that respectively have converging ends and diverging ends.

The second sides of each first fabric layer are respectively connected to the fifth sides of an adjacent one of the second fabric layers by two diagonal folding lines. The first sides of each first fabric layer are respectively connected to the diverging ends of the fifth sides of the adjacent one of the second fabric layers. The third side of each first fabric layer is connected to the converging ends of the fifth sides of the adjacent one of the second fabric layers. The first and second fabric layers are used to form the outer, inner and base walls of the open box-like unit, and the at least one third fabric layer is used to form the at least one side and bottom extensions of the open box-like unit.

According to another aspect of this disclosure, an integrated open box-like woven fabric comprises an open box-like unit including two outer walls, two spaced-apart inner walls connected transversely between the outer walls, a top opening formed between the outer walls and between the inner walls, and a base wall connected to the outer and inner walls oppositely of the top opening. Each of the outer walls has two side extensions each extending outwardly from a junction of the outer wall and a corresponding one of the inner walls. The base wall has two bottom extensions each extending outwardly from a junction of the base wall and the corresponding inner wall. Each of the side extensions forms one corner with one of the bottom extension and with one of the inner walls. The open box-like unit is formed from a flattened fabric preform, which includes a plurality of first yarns arranged at different levels, and a plurality of second yarns interwoven with the first yarns to form a plurality of fabric layers that are foldably/unfoldably connected to each other.

The fabric layers include a first fabric layer, a second fabric layer, and a third fabric layer stacked one over the other. The first fabric layer has a four-sided inner area, a pair of first diagonal sides, and a pair of second diagonal sides. The four-sided inner area has four corners. The first and second diagonal sides extend around the four-sided inner area in an alternating manner and respectively contact the four corners. Two adjacent ones of the first and second diagonal sides extend convergingly toward each other and respectively have converging ends extending outwardly of the four-sided inner area. The third fabric layer has four spaced-apart triangular fabric parts each of which has a third diagonal side connected to one of the first and second diagonal sides by a diagonal folding line, a first side, and a second side connected to the first side and the third diagonal side. The second fabric layer has two non-triangular fabric parts each of which has two opposite first sides respectively connected to two adjacent ones of the triangular fabric parts by two first folding lines, and a second side that interconnects the first sides of the second fabric layer and that is connected to the first fabric layer by a second folding line between two of the corners of the four-sided inner area.

According to still another aspect of this disclosure, an integrated open box-like woven fabric comprises an open box-like unit including two outer walls, two spaced-apart inner walls connected transversely between the outer walls, a top opening formed between the outer walls and between the inner walls, and a base wall connected to the outer and inner walls oppositely of the top opening. Each of the outer walls has two side extensions each extending outwardly from a junction of the outer wall and a corresponding one of the inner walls. The base wall has two bottom extensions each extending outwardly from a junction of the base wall and the corresponding inner wall. Each of the side extensions of each outer wall forms one corner with one of the bottom extensions and with one of the inner walls. The open box-like unit is formed from a flattened fabric preform, which includes a plurality of first yarns arranged at different levels, and a plurality of second yarns interwoven with the first yarns to form a plurality of fabric layers that are foldably/unfoldably connected to each other.

The fabric layers include a first fabric layer, a second fabric layer, a third fabric layer and a fourth fabric layer stacked one over the other. The first fabric layer has two opposite first sides, two opposite second sides interconnecting the first sides, and a four-sided inner area bordered by the first sides and distal from the second sides. The fourth fabric layer has a pair of four-sided fabric parts which are spaced apart from each other and each of which has outer and inner sides. The outer sides of the four-sided fabric parts are respectively connected to the first sides of the first fabric layer by two first folding lines. The inner sides are spaced apart from each other and are disposed between the outer sides.

The second fabric layer has two trapezoidal fabric parts disposed between the first and third fabric layers and spaced apart from each other. Each of the trapezoidal fabric parts has a long side, two diagonal sides that extend convergingly from two opposite ends of the long side and that respectively have converging ends opposite to the long side, and a short side that interconnects the converging ends of the diagonal sides. The long sides of the two trapezoidal fabric parts are connected to the first fabric layer by two second folding lines that extend from one of the first sides to the other one of the first sides of the first fabric layer and that are located between the second sides of the first fabric layer to border the four-sided inner area.

The third fabric layer has four spaced-apart triangular fabric parts each interposed between one of the four-sided fabric parts and one of the trapezoidal fabric parts. Each of the triangular fabric parts is connected to one of the diagonal sides of one of the trapezoidal fabric parts by a diagonal folding line, and is further connected to one of the four-sided fabric parts of the fourth fabric layer by another second folding line.

The four-sided inner area of the first fabric layer forms the base wall of the open box-like unit, two areas of the first fabric layer outside of the four-sided inner area and adjacent to the long sides of the trapezoidal fabric parts form the bottom extensions, the four-sided fabric parts of the fourth fabric layer form the outer walls and the side extensions, and the triangular and trapezoidal fabric parts form the inner walls.

BRIEF DESCRIPTION OF THE DRAWINGS

Other features and advantages of the present disclosure will become apparent in the following detailed description of the embodiments with reference to the accompanying drawings, of which:

FIG. 22 is a view similar to FIG. 21, but with a portion of the flattened fabric preform being cut off along line XXII-XXII of FIG. 21;

FIG. 23 is a view similar to FIG. 21, but with a portion of the flattened fabric preform being cut off along line XXIII-XXIII of FIG. 21;

DETAILED DESCRIPTION

Figure 1:
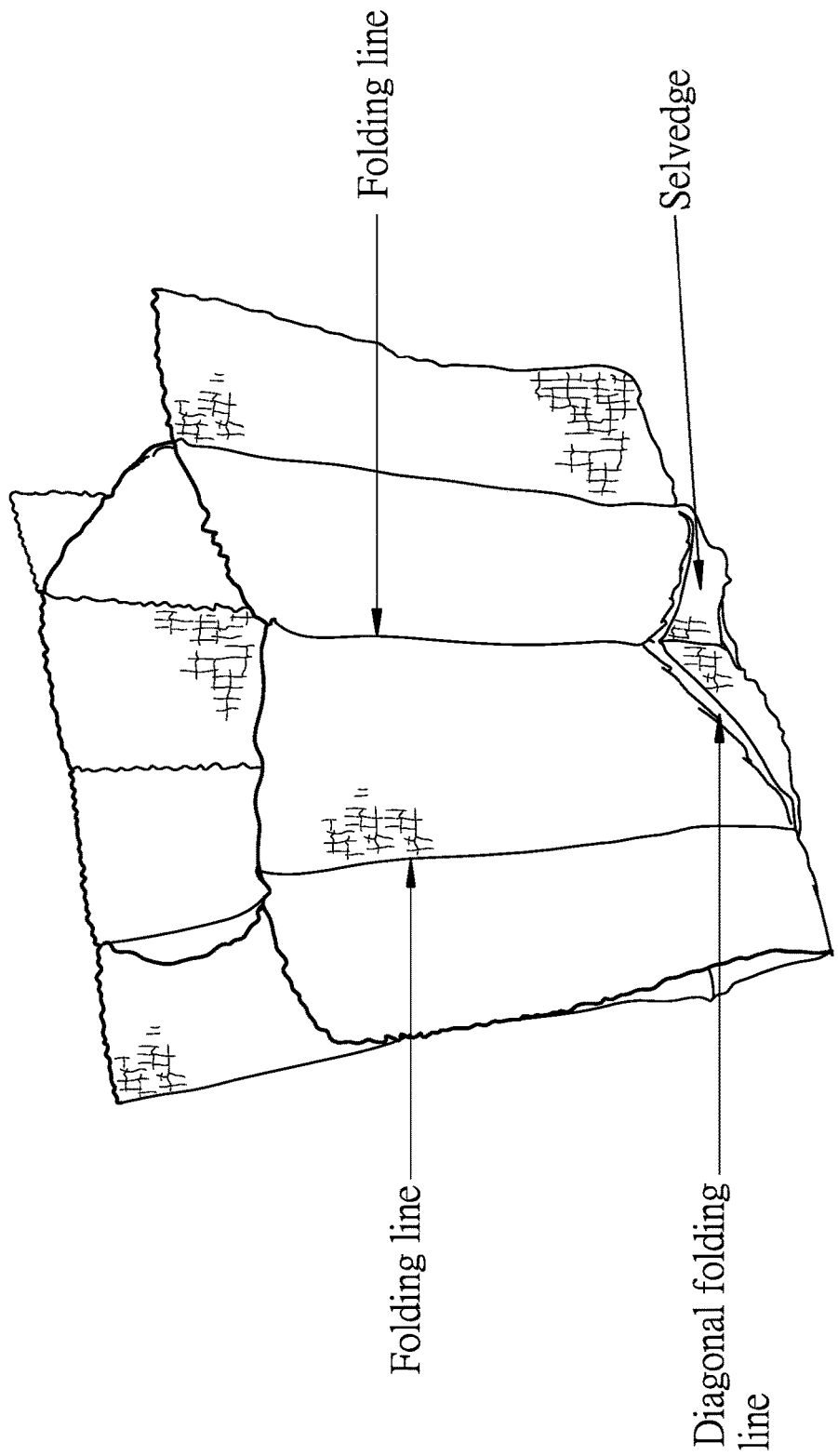
FIG. 1 is a photograph of an integrated open box-like woven fabric according to a first preferred embodiment of the present disclosure.

Before the disclosure is described in greater detail, it should be noted that like elements are denoted by the same reference numerals throughout the disclosure.

Figure 4:
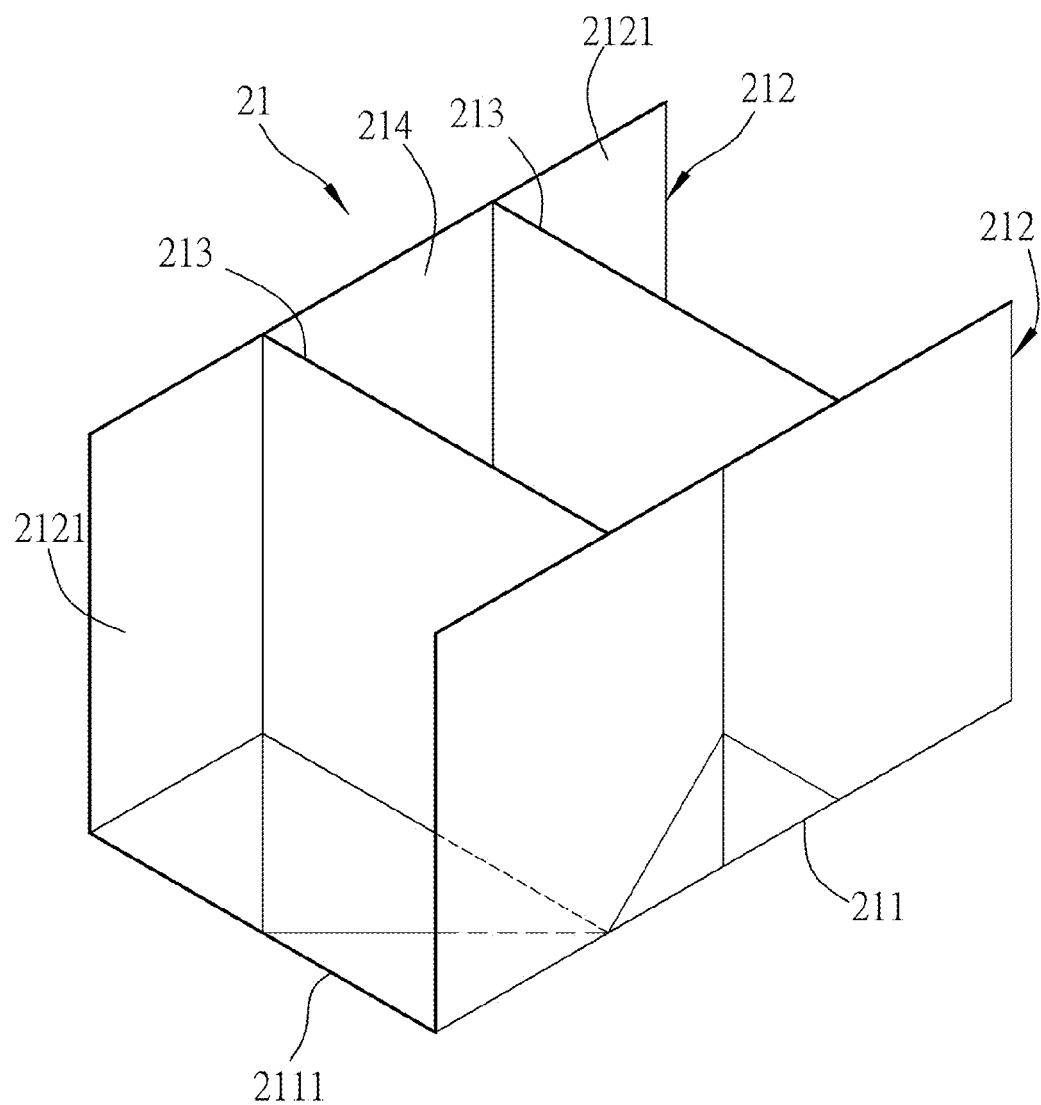
FIG. 4 is a perspective view of a paper mockup of an integrated open box-like woven fabric according to the first embodiment of the present disclosure.

Referring to FIGS. 1 and 4, an integrated open box-like woven fabric according to the first embodiment of the present disclosure comprises an open box-like unit 21 including two outer walls 212, two spaced-apart inner walls 213 connected transversely between the outer walls 212, a top opening 214 formed between the outer walls 212 and between the inner walls 213, and a base wall 211 connected to the outer and inner walls 212, 213 oppositely of the top opening 214. In this embodiment, each of the outer walls 212 has two side extensions 2121 each extending outwardly from a junction of one of the outer walls 212 and a corresponding one of the inner walls 213. The base wall 211 has two bottom extensions 2111 (only one is visible in FIG. 1), each of which extends outwardly from a junction of the base wall 211 and the corresponding one of the inner walls 213. Each bottom extension 2111 is connected between one of the side extensions 2121 of one of the outer walls 212 and a corresponding one of the side extensions 2121 of the other outer wall 212. Each side extension 2121 of each outer wall 212 forms one corner with one of the bottom extensions 2111 and with the corresponding inner wall 213.

Figure 2:
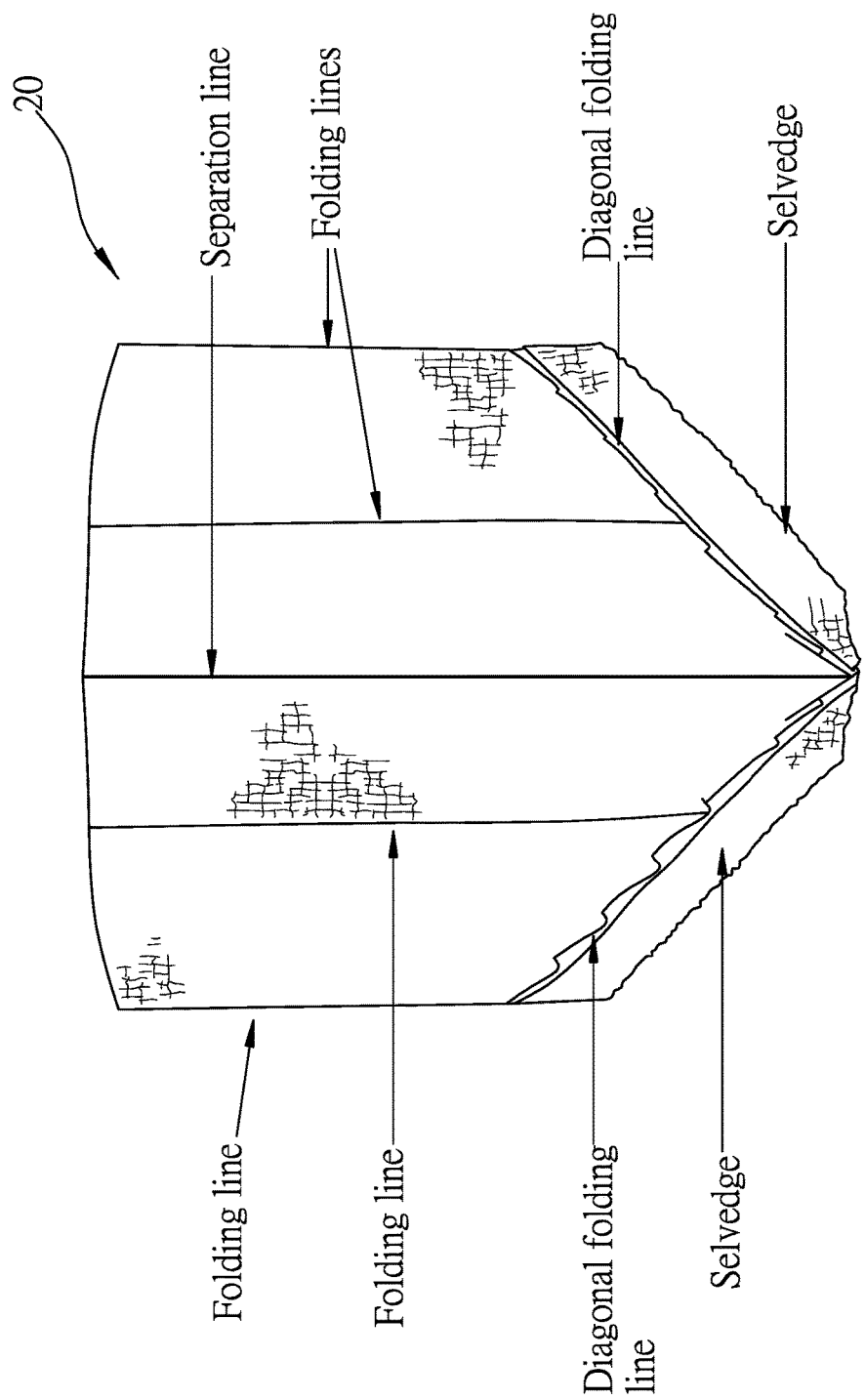
FIG. 2 is a photograph of a flattened fabric preform of the first embodiment in a fully flattened state.
Figure 3:
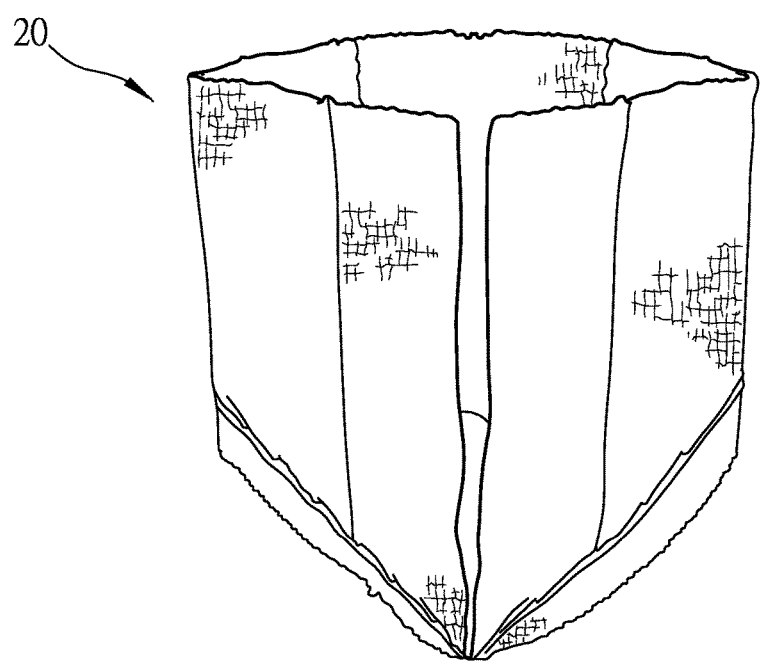
FIG. 3 is a photograph of the flattened fabric preform of the first embodiment in a partially flattened state.
Figure 5:
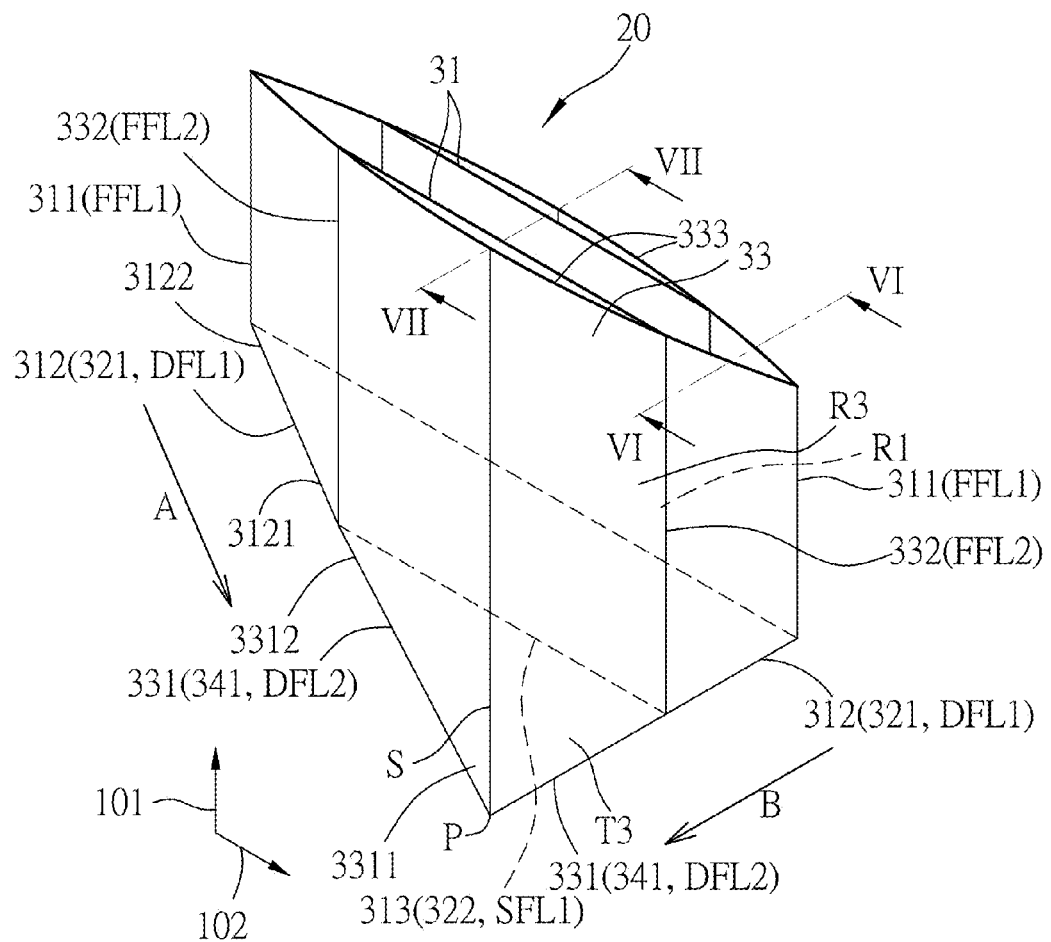
FIG. 5 is a perspective view of a paper mockup of a flattened fabric preform used in forming the open box-like unit of the first embodiment.

Referring to FIGS. 2, 3 and 5, in combination with FIGS. 1 and 4, the open box-like unit 21 is formed from a flattened fabric preform 20 which includes a plurality of first yarns (FY) arranged at six different levels (see FIG. 8), and a plurality of second yarns (SY) interwoven with the first yarns (FY) to form a plurality of fabric layers 3 that are foldably/unfoldably connected to each other along lines each of which extends along one of a first direction 101, a second direction 102, and two diagonal directions (A, B). The first direction 101 corresponds to one of the direction of the first yarns (FY) and the direction of the second yarns (SY). The second direction 102 is transverse to the first direction 101. The two diagonal directions (A, B) are angled to the first and second directions 101, 102 and converge toward each other. In this embodiment, the first yarns (FY) are warp yarns, and the second yarns (SY) are weft yarns.

The fabric layers 3 (see FIG. 6) include two first fabric layers 31, one pair of second fabric layers 32 disposed between the first fabric layers 31, and two third fabric layers 33 each disposed adjacent one of the first fabric layers 31 oppositely of the second fabric layers 32.

Each of the first fabric layers 31 (see FIGS. 5 and 6) has two opposite first sides 311 extending along the first direction 101, two opposite second sides 312 that are respectively connected to and that converge from the first sides 311 along the diagonal directions (A, B), and a third side 313 extending along the second direction 102. The second sides 312 respectively have converging ends 3121 opposite to the first sides 311, and diverging ends 3122 connected to the first sides 311. The third side 313 is connected between the converging ends 3121 of the second sides 312. The first sides 311 of each first fabric layer 31 are respectively connected to the first sides 311 of the other one of the first fabric layers 31 by two first folding lines (FFL1) extending in the first direction 101.

Each of the third fabric layers 33 (see FIGS. 5 and 7) has two opposite fourth sides 331 respectively extending along the diagonal directions (A, B), two opposite sixth sides 332 extending in the first direction 101, and a seventh side 333 interconnecting the sixth sides 332 oppositely of the fourth sides 331. The fourth sides 331 respectively have converging ends 3311 converging to a point (P) (see FIG. 7) opposite to the seventh side 333, and diverging ends 3312 respectively connected to the converging ends 3121 of the second sides 312 of the adjacent one of the first fabric layers 31. The sixth sides 332 are respectively connected to the diverging ends 3312 of the fourth sides 331, are connected foldably/unfoldably to the adjacent one of the first fabric layers 31 by another two first folding lines (FFL2) which extend in the first direction 101, and are located between the first sides 311 of the adjacent first fabric layer 31.

Figure 6:
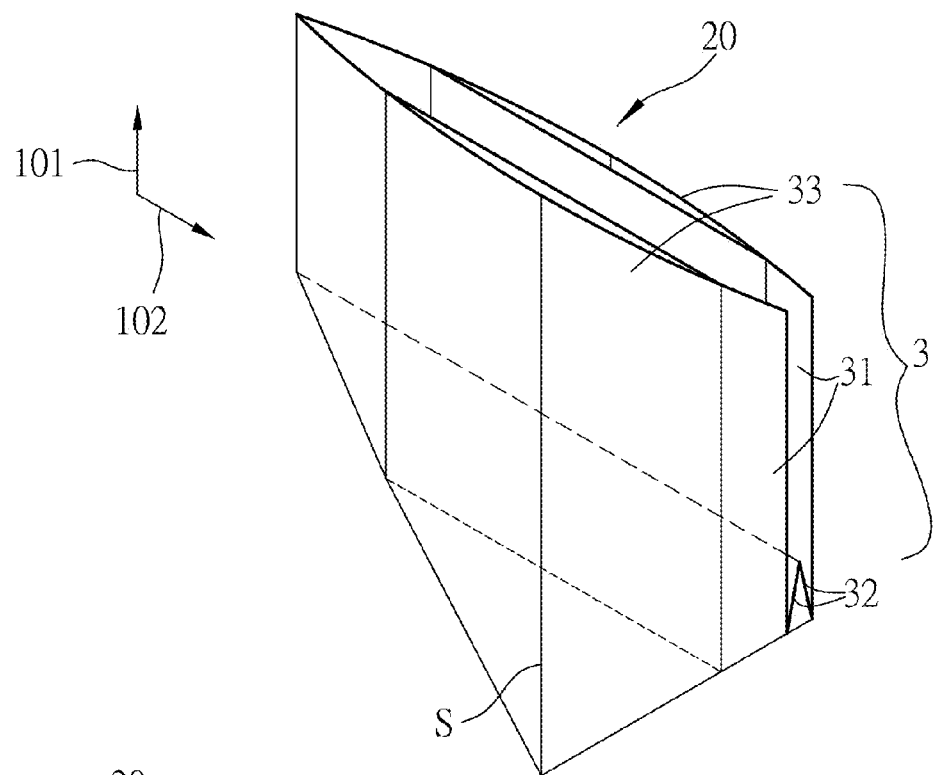
FIG. 6 is a view similar to FIG. 5, but with a portion of the flattened fabric preform being cut off along line VI-VI of FIG. 5.

Each third fabric layer 33 further has a four-sided or rectangular area (R3) bordered by the sixth sides 332 and the seventh side 333, a triangular area (T3) adjoining the rectangular area (R3) and bordered by the fourth sides 331, and a separation line (S) that extends along the first direction 101 from the point (P) to the seventh side 333. The separation line (S), as shown in FIG. 6, separates each of the rectangular area (R3) and the triangular area (T3) into two separated parts. Each first fabric layer 31 further has a rectangular area (R1) (see FIG. 9) immediately underlying the rectangular area (R3) of an adjacent one of the third fabric layers 32.

Figure 7:
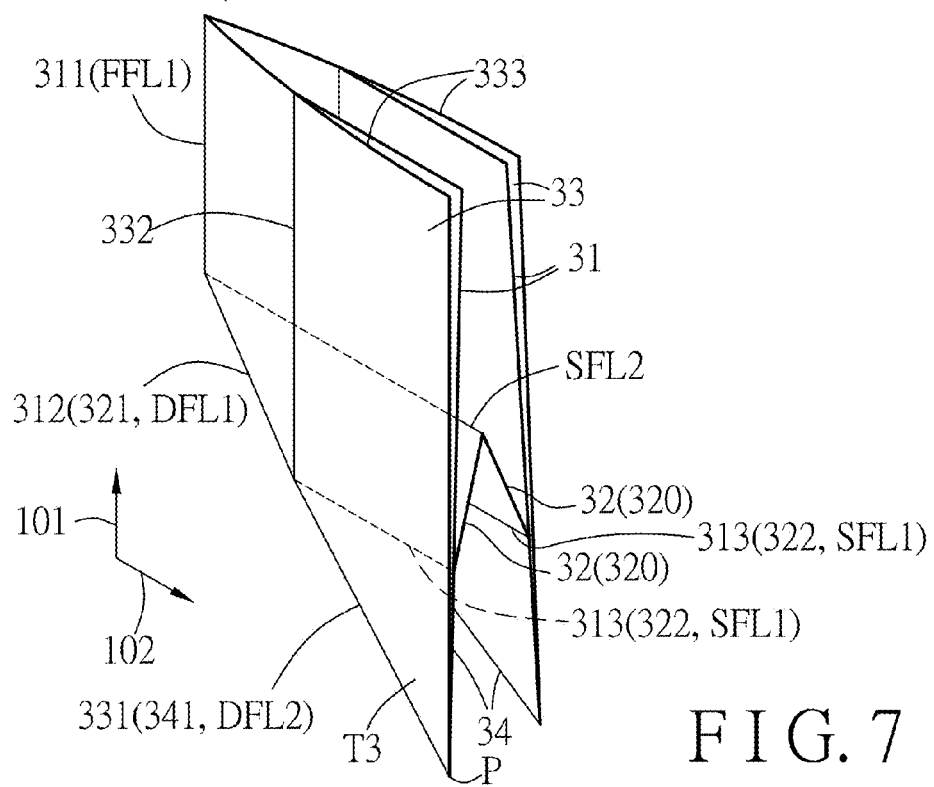
FIG. 7 is a view similar to FIG. 5, but with a portion of the flattened fabric preform being cut off along line VII-VII of FIG. 5.
Figure 9:
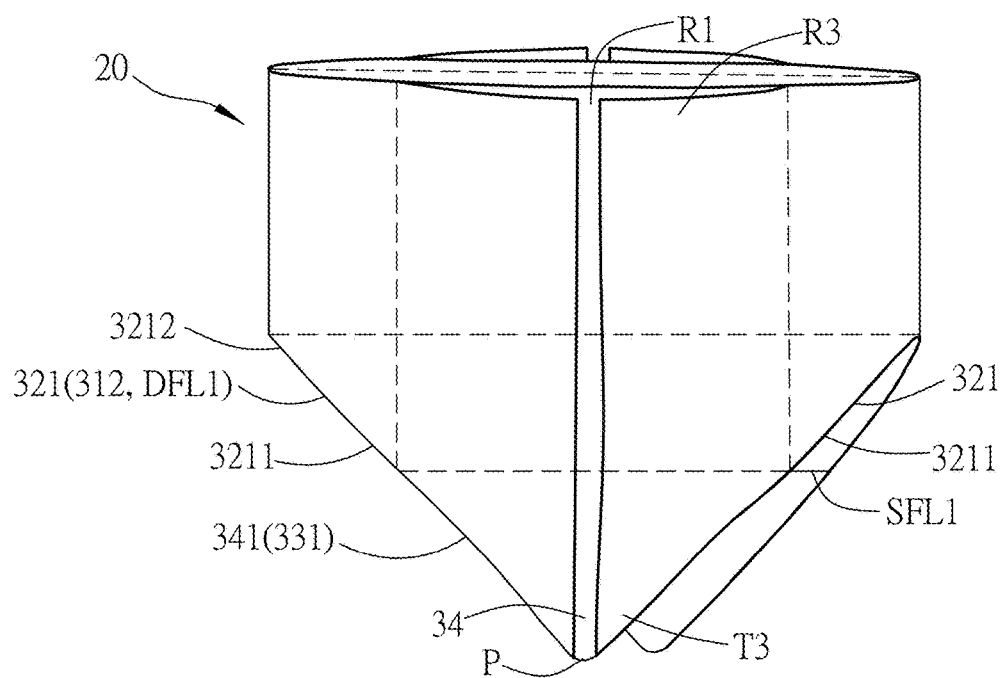
FIG. 9 is another perspective view of the flattened fabric preform of the first embodiment.

As best shown in FIG. 9, in combination with FIG. 7, each of the second fabric layers 32 has a single trapezoidal fabric part 320 which has two opposite fifth sides 321 that respectively extend along the diagonal directions (A, B) and that respectively have converging ends 3211 and diverging ends 3212. The second sides 312 of each first fabric layer 31 are respectively connected to the fifth sides 321 of an adjacent one of the second fabric layers 32 by two diagonal folding lines (DFL1) (see FIG. 9) respectively extending along the diagonal directions (A, B). The first sides 311 of each first fabric layer 31 are respectively connected to the diverging ends 3212 of the fifth sides 321 of the adjacent one of the second fabric layers 32.

Each second fabric layer 32 further has an eighth side 322 connected between the converging ends 3211 of the fifth sides 321. The third side 313 of each first fabric layer 31 is connected to the eighth side 322 of the adjacent second fabric layer 32 by a second folding line (SFL1) extending in the second direction 102 between the converging ends 3211 of the fifth sides 321. Each second fabric layer 32 is connected to the other one of the second fabric layers 32 by another second folding line (SFL2) extending in the second direction 102 between the diverging ends 3212 of the fifth sides 321.

The fabric layers 3 further include two triangular fabric layers 34 each foldably/unfoldably connected to and immediately underlying the triangular area (T3) of the adjacent third fabric layer 33. Each of the triangular fabric layers 34 is a triangular extension that connects and extends continuously and outwardly from the third side 313 of the adjacent first fabric layer 31 and that has two converging extension sides 341 respectively and continuously extending from the second sides 312 of the adjacent first fabric layer 31. The converging extension sides 341 are respectively connected to the fourth sides 331 of the adjacent third fabric layer 33 by another two diagonal folding lines (DFL2), which extend continuously and respectively from the two diagonal folding lines (DFL1).

When the fabric layers 3 of the flattened fabric preform 20 are unfolded and when the separated parts of the third fabric layers 31 are pulled outwardly, the first fabric layers 31 form the outer and inner walls 212, 213 of the open box-like unit 21, and the second fabric layers 32 form the base wall 211. The triangular fabric layers 34 cooperate with the separated parts of the triangular area (T3) of the third fabric layers 332 to form the bottom extensions 2111. The separated parts of the rectangular areas (R3) of the third fabric layers 332 form the side extensions 2121 of the outer walls 212.

Figure 8:
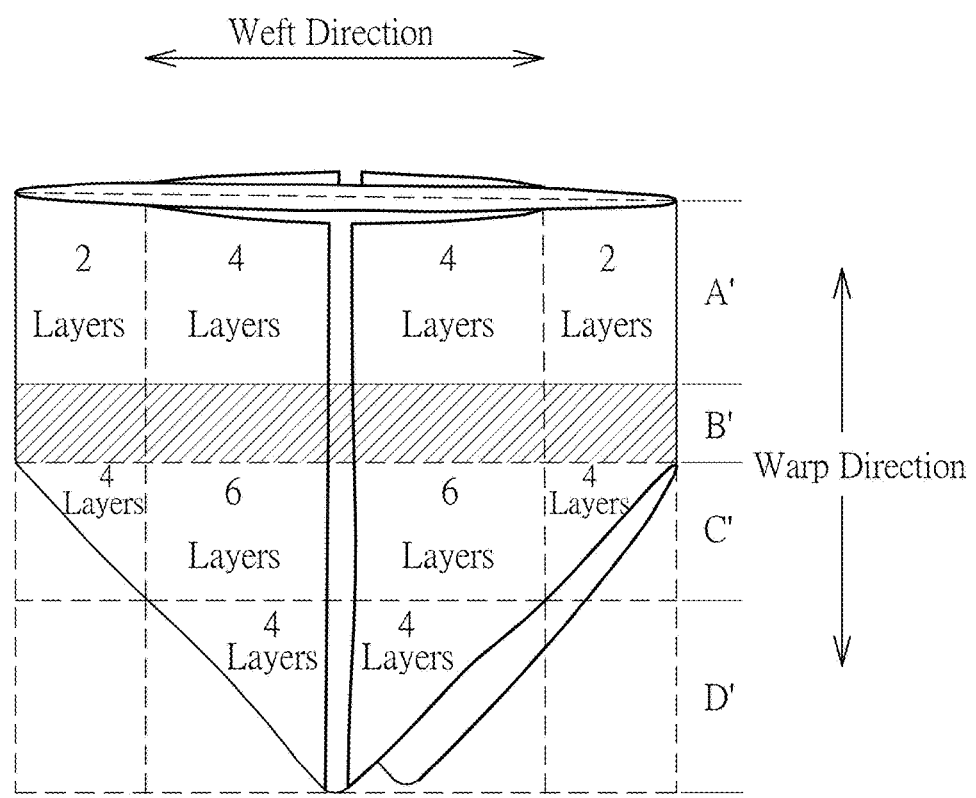
FIG. 8 is a schematic view showing a layer distribution of the flattened fabric preform and different weave regions A'-D' of the flattened fabric preform of the first embodiment.

The flattened fabric 20 may be fabricated using an existing weaving technology and facilities. In an example of a fabrication method, the first yarns (FY) are warp yarns arranged at six yarn levels. The second yarns (SY) are weft yarns and are interwoven with the warp yarns (FY) to form the first, second and third fabric layers (31, 32, 33). As shown in FIG. 8, the flattened fabric preform 20 is divided into weave sections A'-D' according to the layer distribution of the fabric layers. The number of the fabric layers is six and is maximum in weave sections (B') and (C'). The weaving process may be conducted in a warp direction from the weave section (A') to the weave section (D'). The weft yarns are interwoven with the warp yarns by drawing the weft yarns along different interlacing paths designed for weave sections A'-D' according to the requirement of the layer distribution shown in FIG. 8. The first, second and diagonal folding lines (FFL, SFL, and DFL) may be formed by reversing weft yarns and/or by interchanging and interlacing the warp and/or weft yarns between different yarn levels.

Referring to FIGS. 10 to 12B, an integrated open box-like woven fabric according to the second embodiment of the present disclosure is shown to be generally similar to the first embodiment. However, in this embodiment, the fabric layers 3 of the flattened fabric preform 20' include two pairs of the second fabric layers 32, and further include a fourth fabric layer 36 disposed between and connected foldably/unfoldably to two adjacent pairs of the second fabric layers 32 for being used to form an additional inner wall 213 (see FIG. 10) of the open box-like unit 21'.

Figure 10:
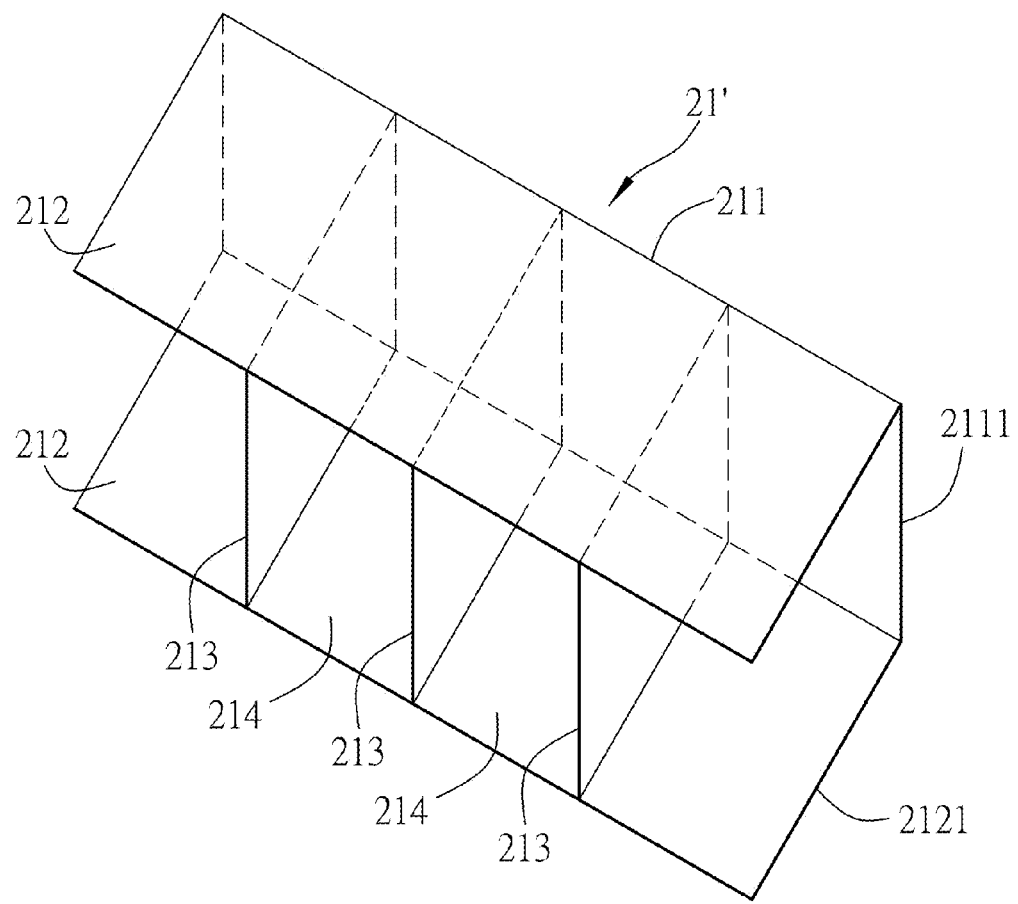
FIG. 10 is a schematic top view of an open box-like unit of an integrated open box-like woven fabric according to the second embodiment of the present disclosure.
Figure 11:
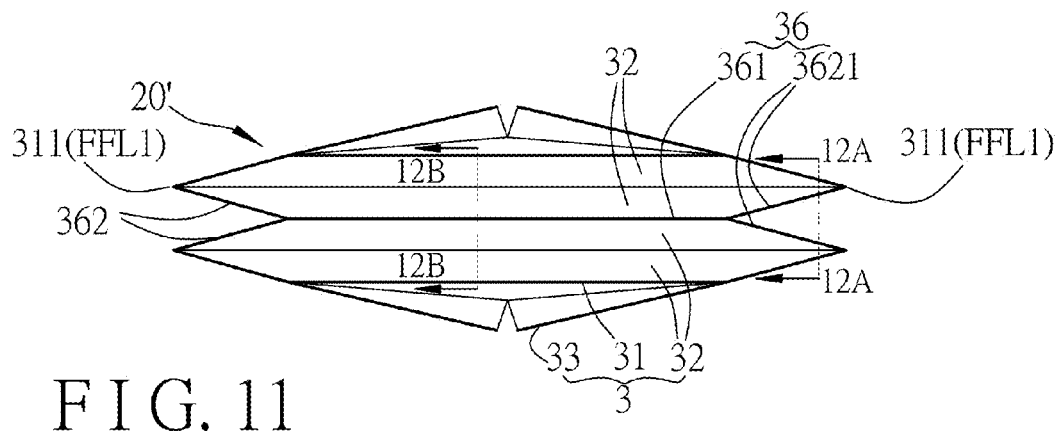
FIG. 11 is a schematic top view of a flattened fabric preform used in forming the open box-like unit of the second embodiment.
Figure 12A:
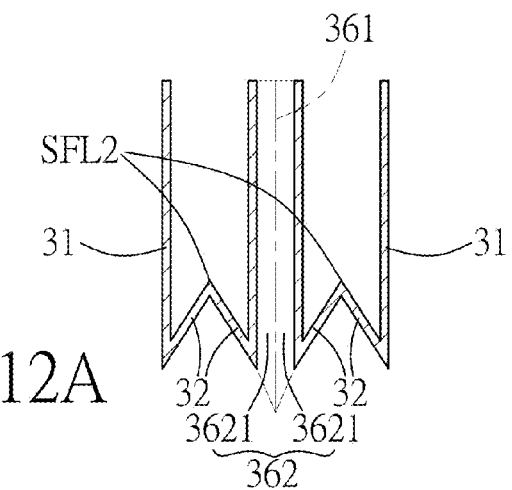
FIG. 12A is a sectional view taken along line 12A-12A of FIG. 11.
Figure 12B:
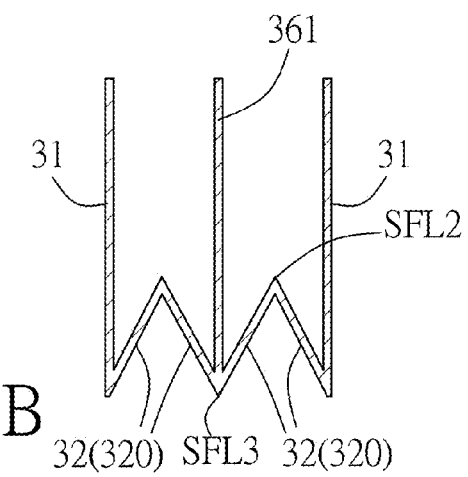
FIG. 12B is a sectional view taken along line 12B-12B of FIG. 11.

The fourth fabric layer 36 has a mid-portion 361, and two opposite end portions 362 connected to two opposite sides of the mid-portion 361. The mid-portion 361 is disposed between two adjacent ones of the trapezoidal fabric parts 320 of the adjacent pairs of the second fabric layers 32, and is foldably/unfoldably connected to the two adjacent ones of the trapezoidal fabric parts 320 by another second folding line (SFL3) extending along the second direction 102 between the converging ends 3211 (see FIG. 9) of the fifth sides 321. Each of the opposite end portions 362 is bifurcated to form two branching parts 3621. The first sides 311 of each first fabric layer 31 are respectively connected to one of the branching parts 3621 of one of the opposite end portions 362 (at the left side of FIG. 11) and one of the branching parts 3621 of the other opposite end portions 362 (at the right side of FIG. 11) by two first folding lines (FFL1) extending along the first direction 101. When the fabric layers 3 of the flattened fabric preform 20' are unfolded, the open box-like unit 21' is formed with two outer walls 212, three inner walls 213, a base wall 211 and two top openings 214, as shown in FIG. 10.

Figure 13:
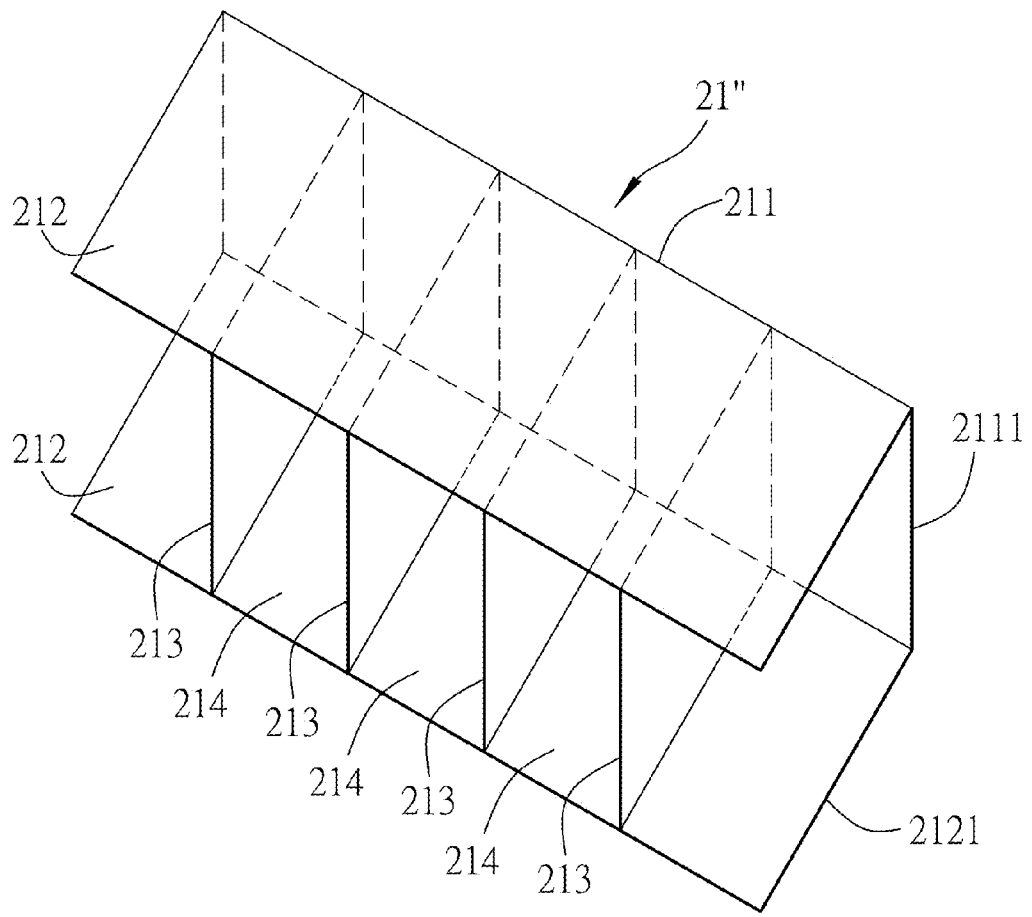
FIG. 13 is a schematic top view of an open box-like unit of an integrated open box-like woven fabric according to the third embodiment of the present disclosure.
Figure 14:
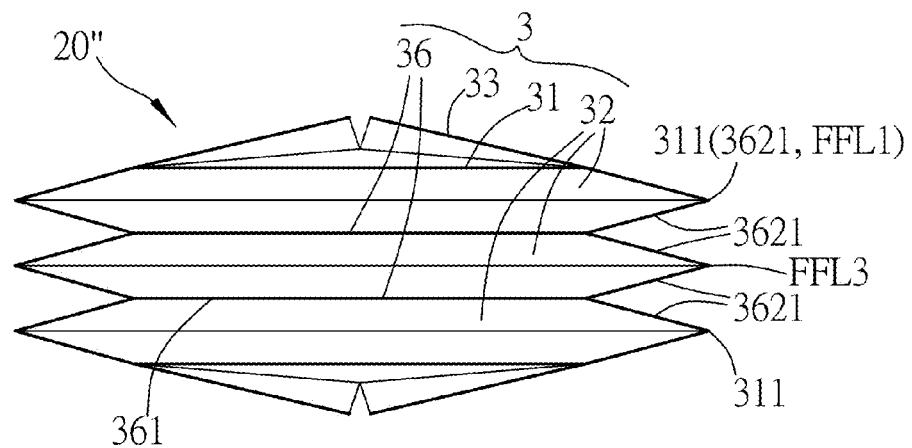
FIG. 14 is a schematic top view of a flattened fabric preform used in forming the open box-like unit of the third embodiment.

Referring to FIGS. 13 and 14, an integrated open box-like woven fabric according to the third embodiment of the present disclosure is shown to be similar to the second embodiment. However, in this embodiment, the fabric layers 3 of the flattened fabric preform 20" include three pairs of the second fabric layers 32 and two fourth fabric layers 36. Each first side 311 of one of the first fabric layers 31 is connected to one of the branching parts 3621 (upper branching part 3621 at the right side of FIG. 14) of one of the opposite end portions 362 (see FIG. 12A) of an adjacent one of the fourth fabric layers 36 by one of the first folding lines (FFL1) extending in the first direction 101. The another one of the branching parts 3621 (the lower branching part 3621 at the right side of FIG. 14) of the opposite end portion 362 of the adjacent one of the fourth fabric layers 36 is connected to one of the branching parts 3621 of one of the opposite end portions 362 of another one of the fourth fabric layers 36 by another one of the first folding lines (FFL3). When the fabric layers 3 of the flattened fabric preform 20" are unfolded, the open box-like unit 21" is formed with two outer walls 212, four inner walls 213, a base wall 211 and three top openings 214.

Figure 15:
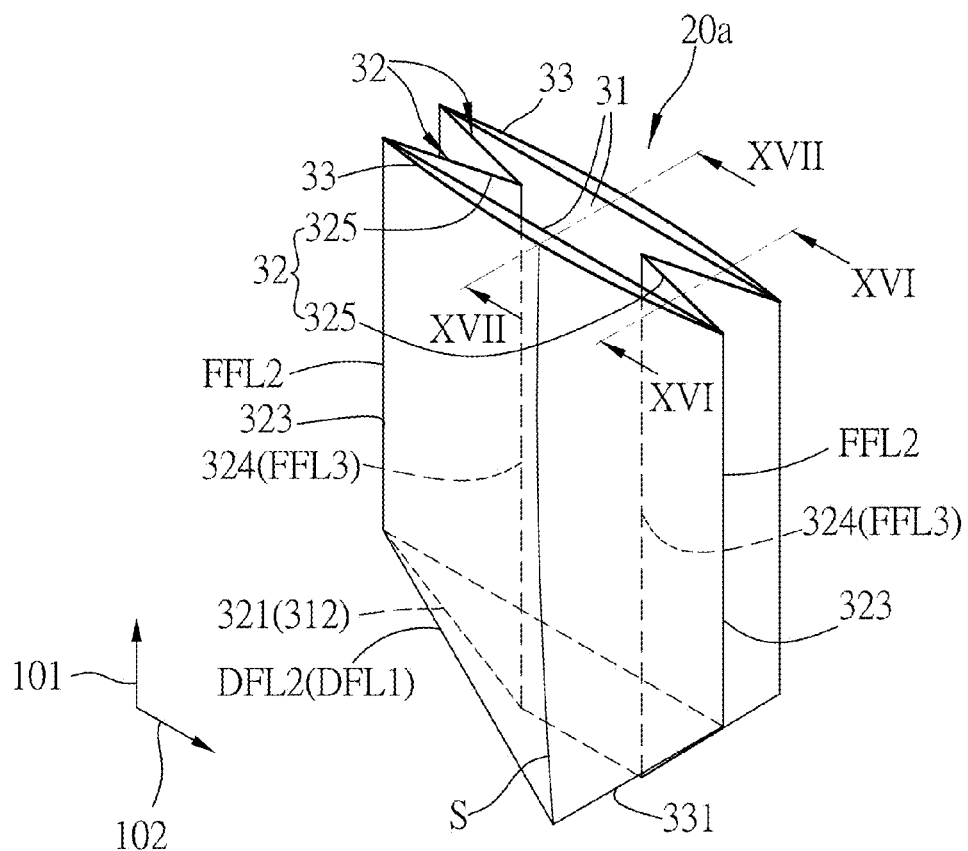
FIG. 15 is a perspective view of a flattened fabric preform used in forming the open box-like unit of an integrated open box-like woven fabric according to the fourth embodiment of the present disclosure.
Figure 16:
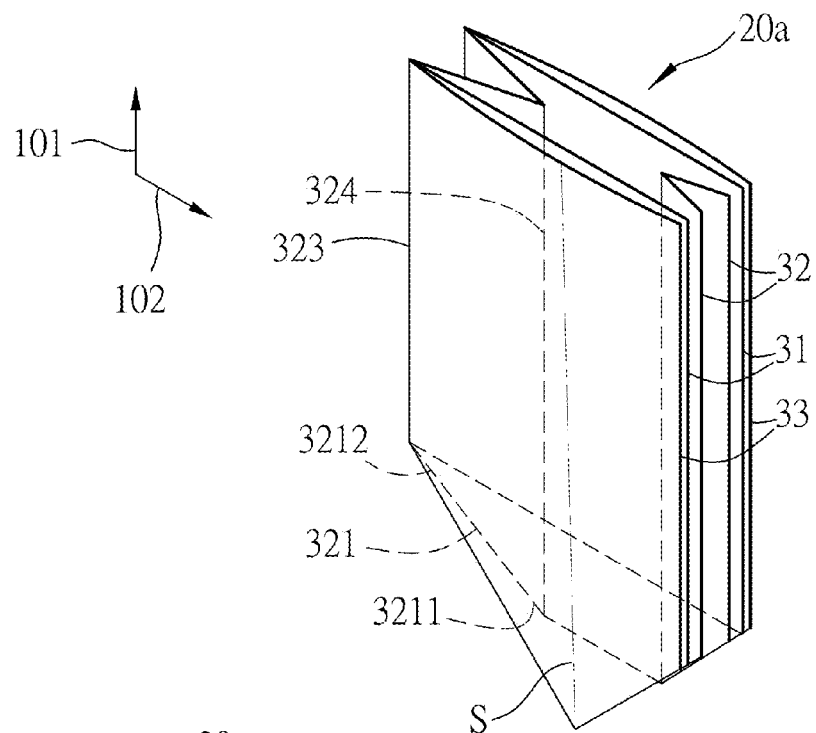
FIG. 16 is a view similar to FIG. 15, but with a portion of the flattened fabric preform being cut off along line XVI-XVI of FIG. 15.
Figure 17:
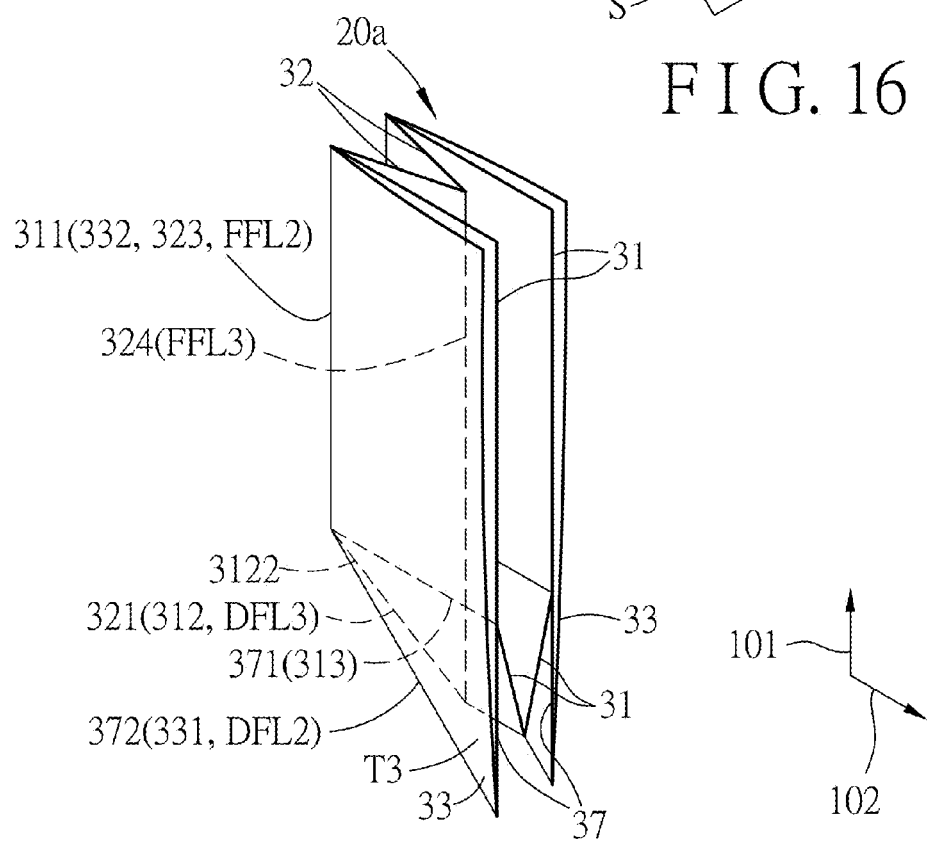
FIG. 17 is a view similar to FIG. 15, but with a portion of the flattened fabric preform being cut off along line XVII-XVII of FIG. 15.

Referring to FIGS. 15 to 17, an integrated open box-like woven fabric according to the fourth embodiment of the present disclosure is shown to be generally similar to the first embodiment. However, in this embodiment, the sixth sides 332 of each third fabric layer 33 of the flattened fabric preform (20a) respectively meet and join foldably/unfoldably the first sides 311 of the adjacent first fabric layer 31. Each triangular fabric layer 37 (see FIG. 17) immediately underlies the triangular area (T3) of the adjacent third fabric layer 33, and is formed as a triangular layer that is disposed between one of the first fabric layers 31 and the adjacent third fabric layer 33, that has one side 371 connected foldably/unfoldably to the third side 313 of adjacent first fabric layer 31 between the diverging ends 3122 of the second sides 312, and two other sides 372 that are opposite to each other and that are respectively and foldably/unfoldably connected to the fourth sides 331 of the adjacent third fabric layer 33 by two diagonal folding lines (DFL2) extending in the diagonal directions (A, B).

Each of the second fabric layers 32 has two fabric parts 325 (see FIG. 15), which are spaced apart along the second direction 102, and each of which has a fifth side 321, a ninth side 323 extending in the first direction 101, and a tenth side 324 substantially parallel to the ninth side 323. The ninth side 323 (see FIG. 16) of each fabric part 325 is connected to the diverging end 3212 of the fifth side 321. The tenth side 324 of each fabric part 325 is connected to the converging end 3211 of the fifth side 321. The tenth sides 324 (see FIG. 15) are disposed between the ninth sides 323.

The first sides 311 of each first fabric layer 31 are respectively connected to the ninth sides 323 of the fabric parts 325 of an adjacent one of the second fabric layers 32 by two of the first folding lines (FFL2). The fifth sides 321 (see FIG. 17) of the fabric parts 325 of each second fabric layer 32 are respectively connected to the second sides 312 of the adjacent one of the first fabric layers 31 by two diagonal folding lines (DFL3). The tenth sides 324 of the fabric parts 325 of each second fabric layer 32 are respectively connected to the tenth sides 324 of the fabric parts 325 of the other second fabric layer 32 along two first folding lines (FFL3) (see FIG. 15) located between the two first folding lines (FFL2).

When the fabric layers 3 of the flattened fabric preform (20a) are unfolded relative to each other, the first fabric layers 31 form the inner walls 213 of the open box-like unit 21 (see FIG. 1), and the second fabric layers 32 form the outer and base walls 212, 211 of the open box-like unit 21.

Figure 18:
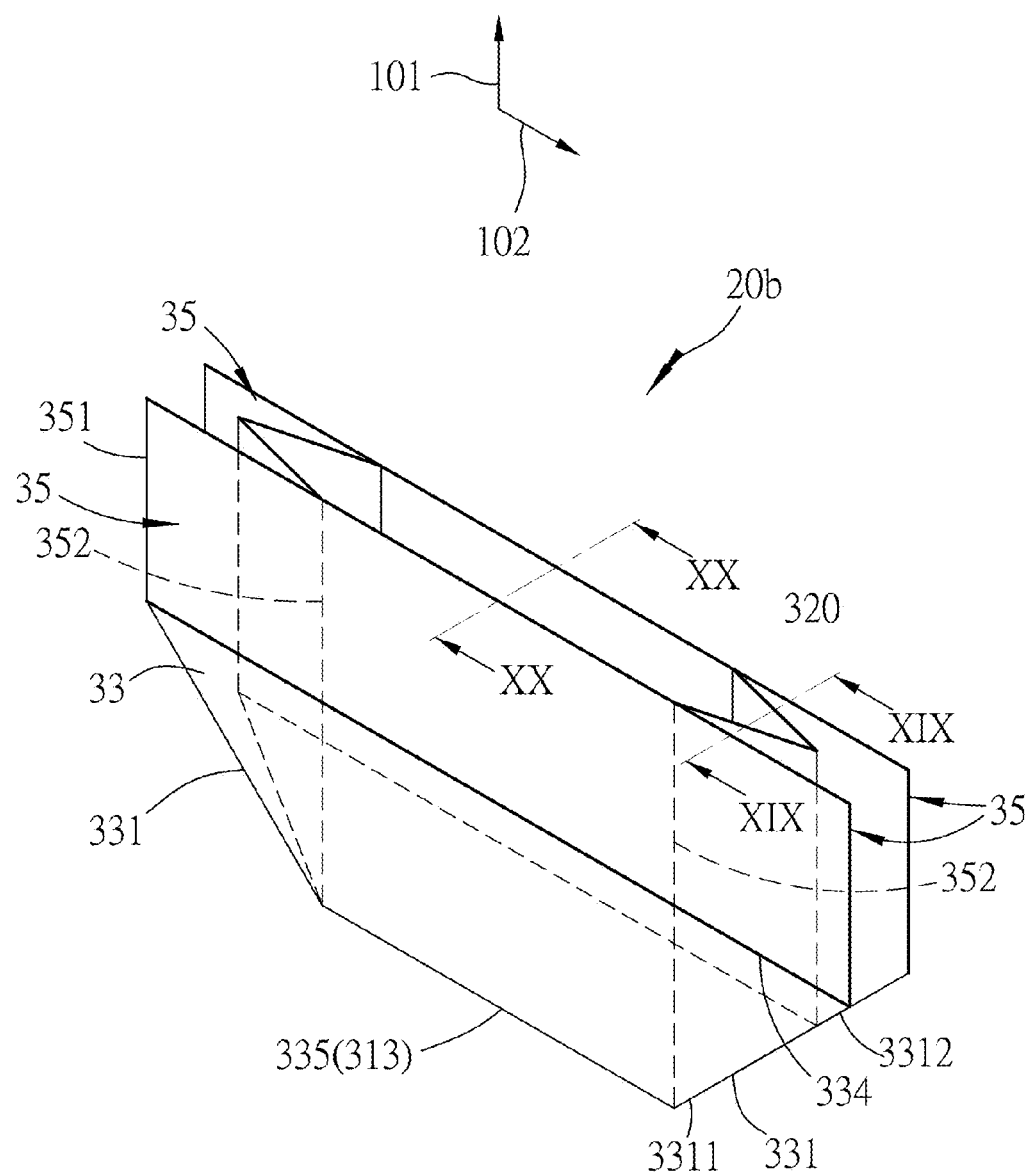
FIG. 18 is a perspective view of a flattened fabric preform used in forming the open box-like unit of an integrated open box-like woven fabric according to the fifth embodiment of the present disclosure.
Figure 19:
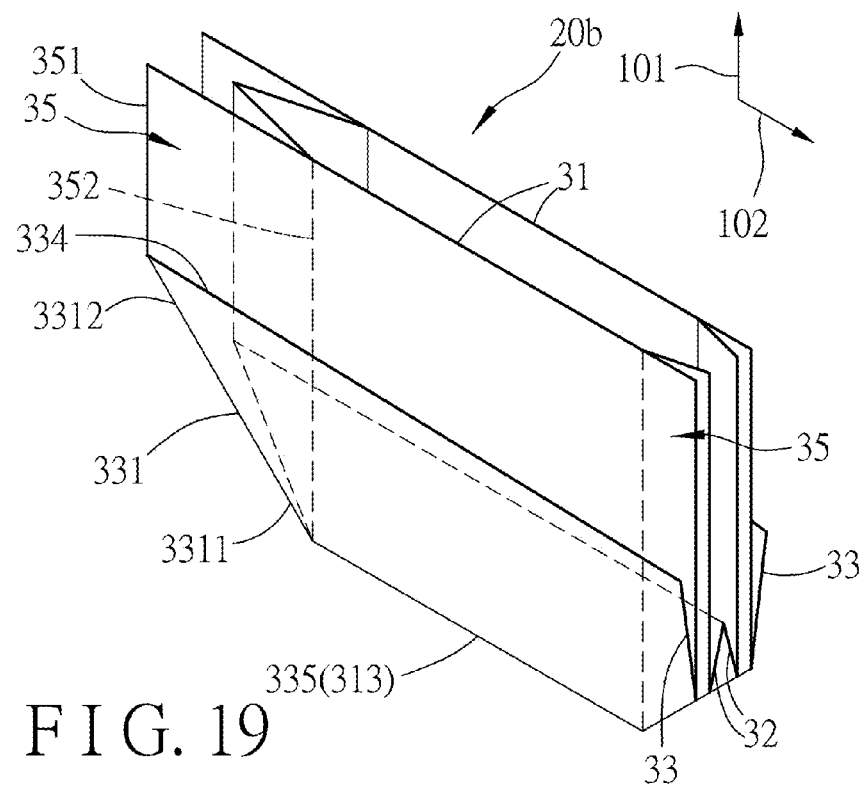
FIG. 19 is a view similar to FIG. 18, but with a portion of the flattened fabric preform being cut off along line XIX-XIX of FIG. 18.
Figure 20:
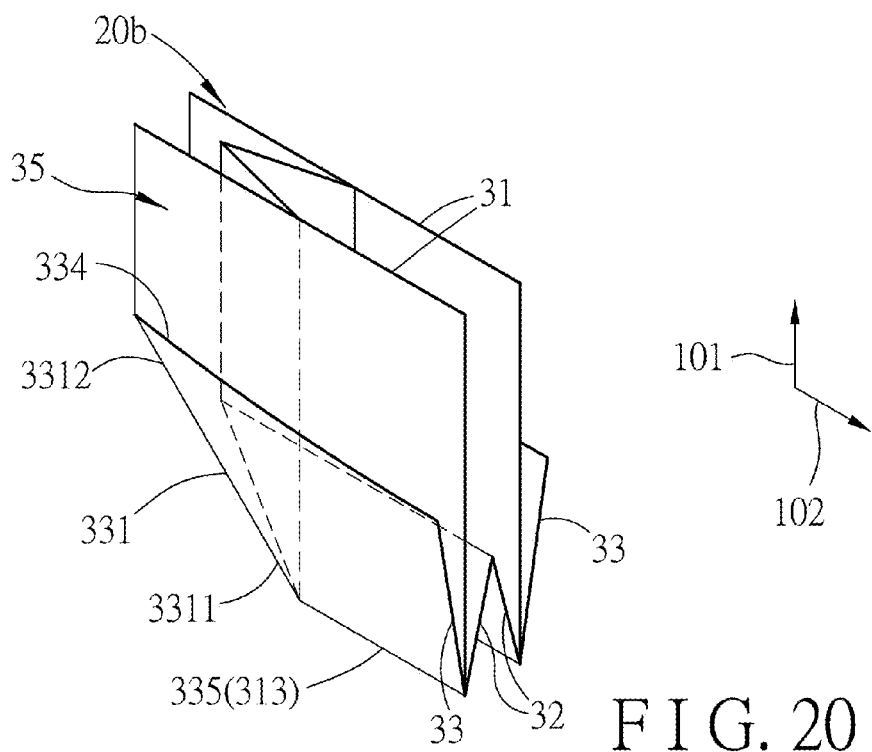
FIG. 20 is a view similar to FIG. 18, but with a portion of the flattened fabric preform being cut off along line XX-XX of FIG. 18.

Referring to FIGS. 18 to 20, an integrated open box-like woven fabric according to the fifth embodiment of the present disclosure is shown to be generally similar to the first embodiment. However, in this embodiment, each third fabric layer 33 of the flattened fabric preform (20b) is trapezoidal. In addition to the fourth side 331, each third fabric layer 33 has an eleventh side 334 that extends in the second direction 102 and that is connected between the diverging ends 3312 of the fourth sides 331, and a twelfth side 335 that extends in the second direction 102 and that is connected between the converging ends 3311 of the fourth sides 331. Further, each third fabric layer 33 does not have the separation line (S) (see FIG. 5) of the first embodiment. The twelfth side 335 of each third fabric layer 33 is connected to the third side 313 (see FIG. 20) of the adjacent first fabric layer 31. The fabric layers 3 further include four flap members 35 (see FIG. 18), each two of which are spaced apart along the second direction 102 and which face an inner surface of an adjacent one of the third fabric layers 33. Each of the flap members 35 is formed in a layer disposed between the third and first fabric layers 33, 31, and has an outer side 351 and an inner side 352 both extending in the first direction 101. The inner sides 352 of the flap members 35 are located between the outer sides 351 thereof. The fourth sides 331 of each third fabric layer 33 are respectively and foldably/unfoldably connected to the outer sides 351 of the flap members 35 along the two diagonal directions (A, B).

When the eleventh sides 334 of the third fabric layers 33 of the flattened fabric preform (20b) are pulled outwardly and unfolded, the first fabric layers 31 form the outer and inner walls 212, 213 of the open box-like unit 21 (see FIG. 1), the second fabric layers 32 form the base wall 211 of the open box-like unit 21, and the third fabric layers 33 form the bottom extensions 2111 of the open box-like unit 21.

Figure 21:
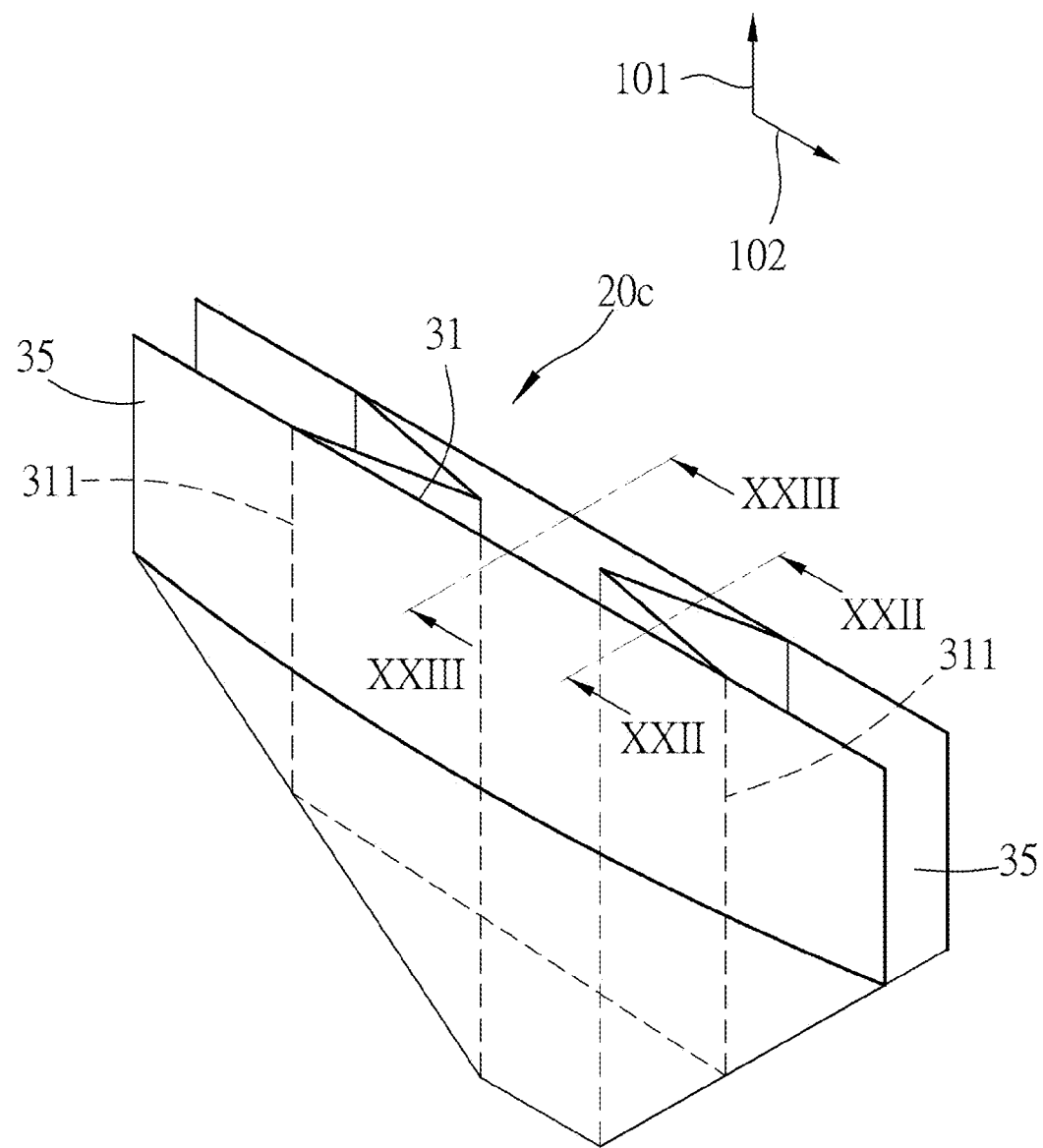
FIG. 21 is a perspective view of a flattened fabric preform used in forming the open box-like unit of an integrated open box-like woven fabric according to the sixth embodiment of the present disclosure.
Figure 24:
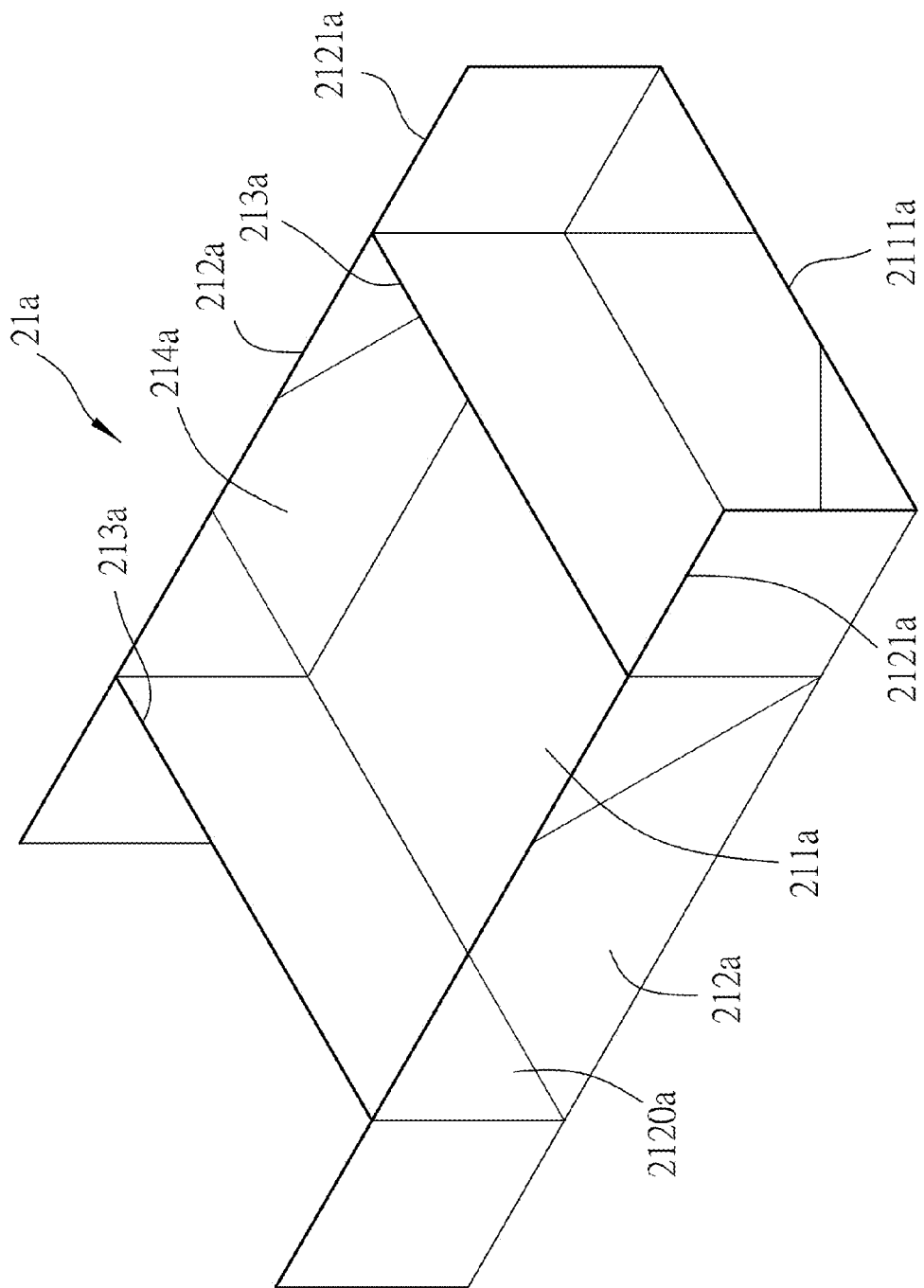
FIG. 24 is a perspective view of an open box-like unit of an integrated open box-like woven fabric according to the seventh embodiment of the present disclosure.
Figure 25:
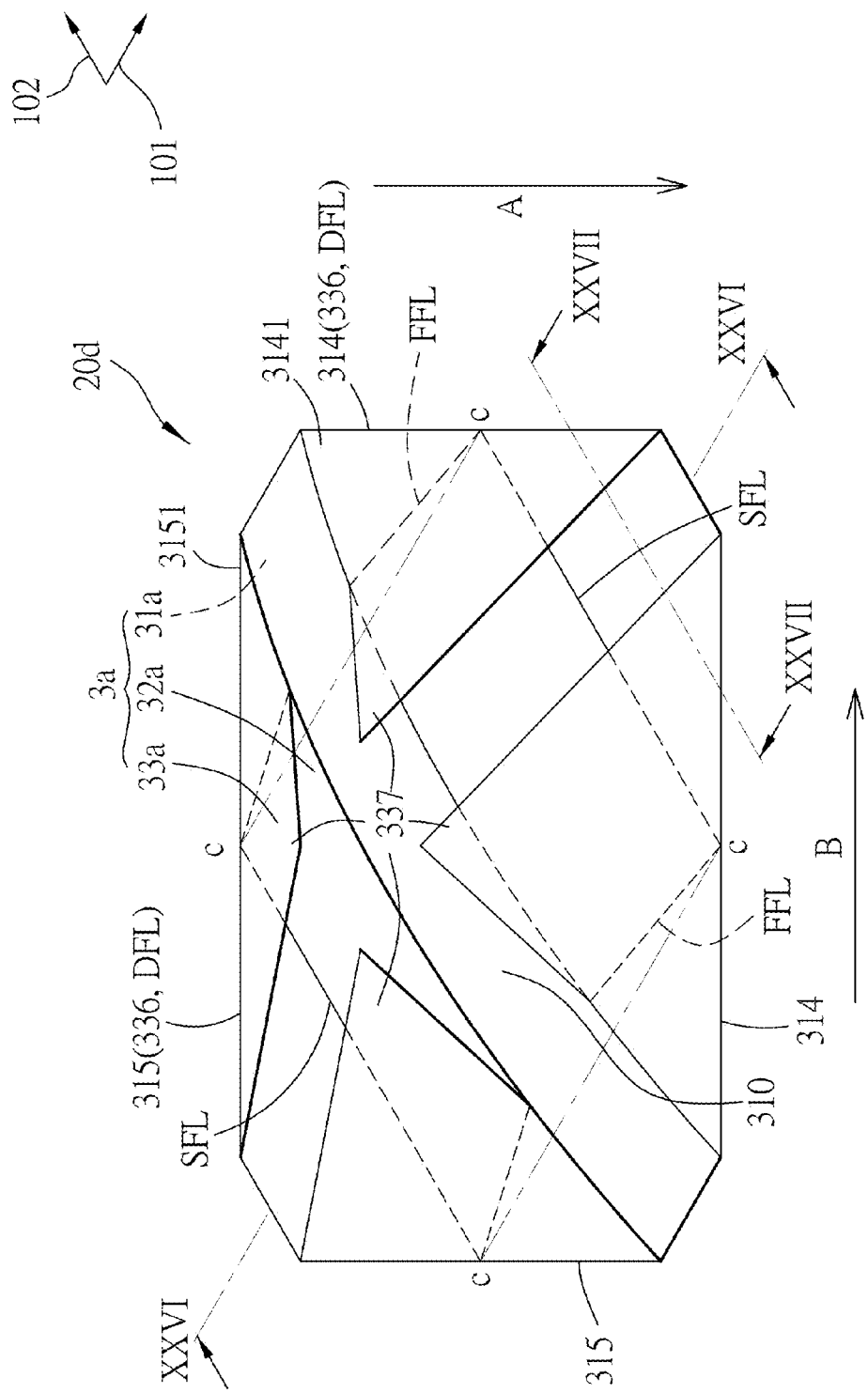
FIG. 25 is a perspective view of a flattened fabric preform used in forming the open box-like unit of the seventh embodiment.

Referring to FIGS. 21 to 23, an integrated open box-like woven fabric according to the sixth embodiment of the present disclosure is shown to be similar to the fourth embodiment. However, in this embodiment, each third fabric layer 33 is trapezoidal, and the flap members 35 are formed in each first fabric layer 31 of the flattened fabric preform (20c). Specifically, each flap member 35 is connected to and extends outwardly from a corresponding first side 311 of the first fabric layer 31. Each flap member 35 has an irregular trapezoidal shape.

Referring to FIGS. 24 to 27, an integrated open box-like woven fabric according to the seventh embodiment of the present disclosure is shown. The open box-like unit (21a) includes two outer walls (212a), two spaced-apart inner walls (213a) connected transversely between the outer walls (212a), a top opening (214a) formed between the outer walls (212a) and between the inner walls (213a), and a base wall (211a) connected to the outer and inner walls (212a, 213a) oppositely of the top opening (214a). Each outer wall (212a) has two side extensions (2121a), and the base wall (211a) also has two bottom extensions (2111a) (only one is visible in FIG. 25). The open box-like unit (21a) is formed from a flattened fabric preform (20d) which includes a plurality of fabric layers (3a).

The fabric layers (3a) include first (bottom), second (intermediate) and third (top) fabric layers (31a, 32a, 33a) stacked one over the other. The first fabric layer (31a) has a four-sided inner area 310, a pair of first diagonal sides 314 extending along a diagonal direction (A), and a pair of second diagonal sides 315 extending along a diagonal direction (B). The four-sided inner area 310 has four corners (c). The first and second diagonal sides 314, 315 extend around the four-sided inner area 310 in an alternating manner and respectively contact the four corners (c). Two adjacent ones of the first and second diagonal sides 314, 315 extend convergingly toward each other and respectively have converging ends 3141, 3151 extending outwardly of the four-sided inner area 310. The third fabric layer (33a) has four spaced-apart triangular fabric parts 337 (see FIG. 25). Each triangular fabric part 337 has a third diagonal side 336 connected to one of the first and second diagonal sides 314, 315 by a diagonal folding line (DFL) extending in one of the diagonal directions (A, B), a first side 338 extending along a first direction 101, and a second side 339 extending along a second direction 102 transverse to the first direction 101 and connected to the first side 338 and the third diagonal side 336. The two diagonal directions (A, B) are angled to the first and second directions 101, 102 and converge toward each other.

Figure 26:
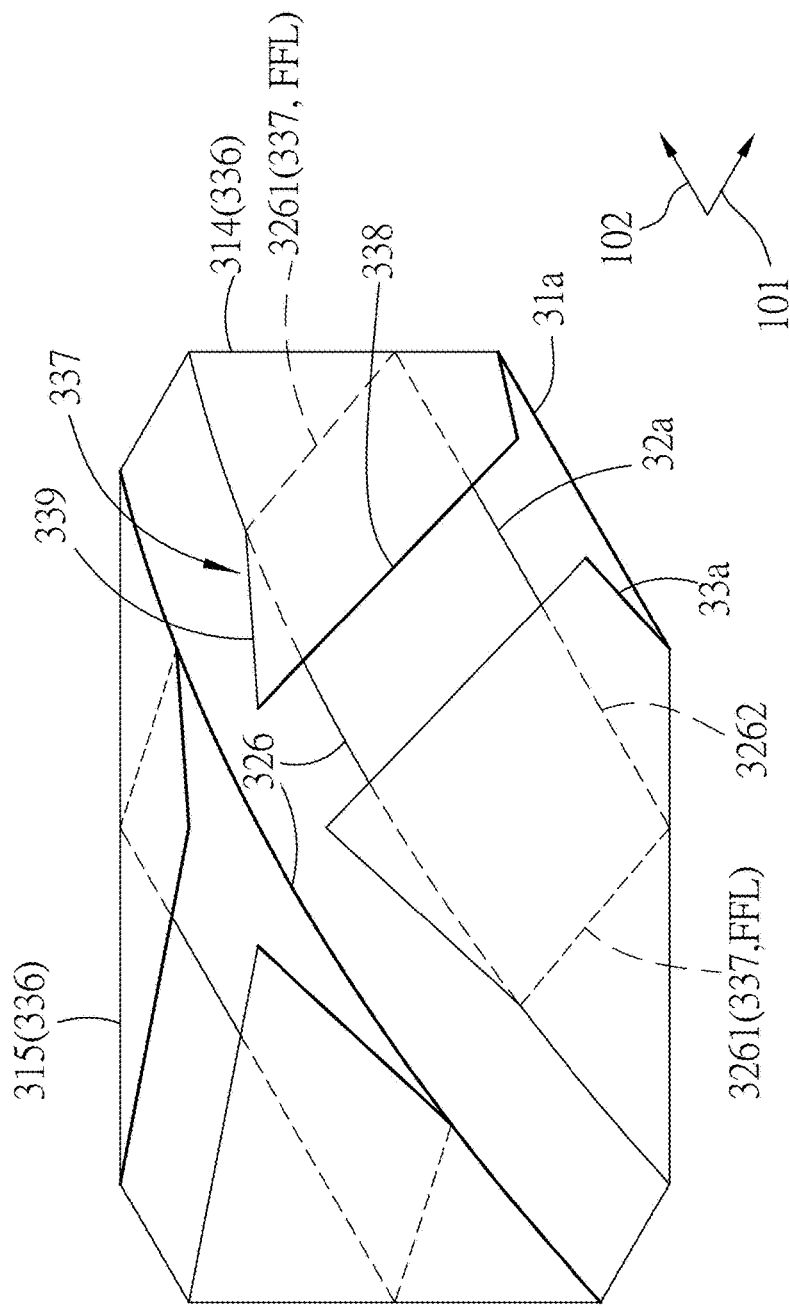
FIG. 26 is a view similar to FIG. 25, but with a portion of the flattened fabric preform being cut off along line XXVI-XXVI of FIG. 25.
Figure 27:
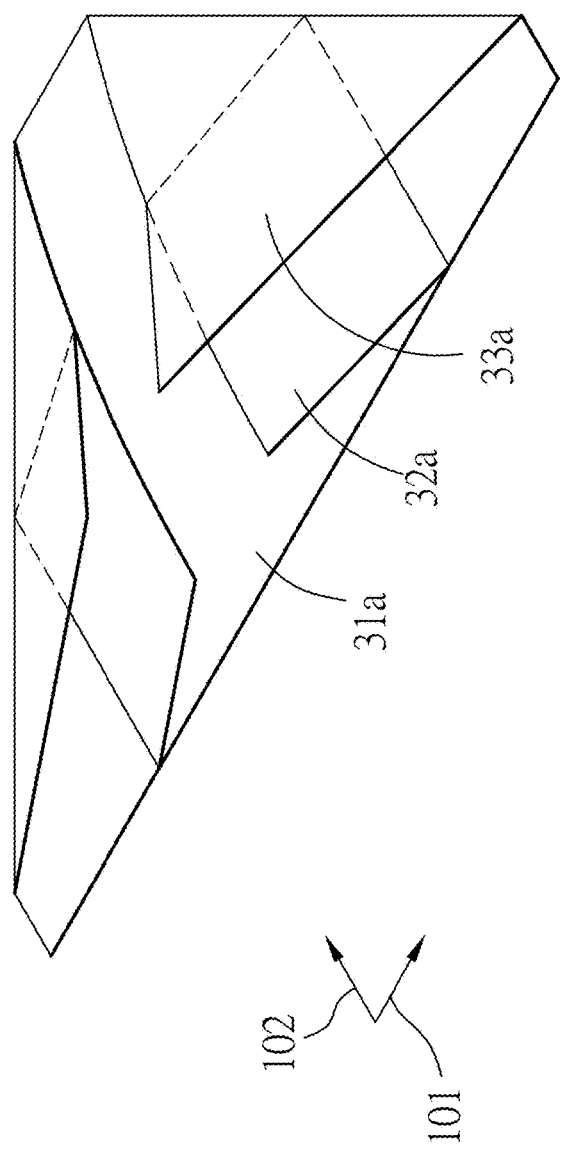
FIG. 27 is a view similar to FIG. 25, but with a portion of the flattened fabric preform being cut off along line XXVII-XXVII of FIG. 25.

The second fabric layer (32a) is disposed between the first and third fabric layers (31a, 33a) and overlying the four-sided inner area 310. The second fabric layer (32a) has two non-triangular fabric parts 326 (FIG. 26). Each non-triangular fabric part 326 is rectangular, and has two opposite first sides 3261 extending in the first direction 101 and respectively connected to two adjacent ones of the triangular fabric parts 337 by two first folding lines (FFL) extending in the first direction 101, and a second side 3262 that extends in the second direction 102, that interconnects the first sides 3261, and that is connected to the first fabric layer 31 by a second folding line (SFL) extending in the second direction 102 between two of the corners (c) of the four-sided inner area 310.

The flattened fabric preform (20d) may be fabricated by arranging the first yarns (FY) at three yarn levels for use as warp yarns and by using the second yarns (SY) as weft yarns to interweave with the first yarns (FY).

When the flattened fabric preform (20d) is unfolded, the four-sided inner area 310 forms the base wall (211a), two areas of the first fabric layer (31a) outside of the four-sided inner area 310 and adjacent to the second folding lines (SFL) form the bottom extensions (2111a), and two another areas of the first fabric layer (31a) outside of the four-sided inner area 310 form parts of the outer walls (212a). Further, the first folding lines (FFL) extend upright from the first fabric layer (31a), and each triangular fabric part 337 forms one of the side extensions (2121a) and a triangular part (2120a) of one of the outer walls (212a).

Figure 28:
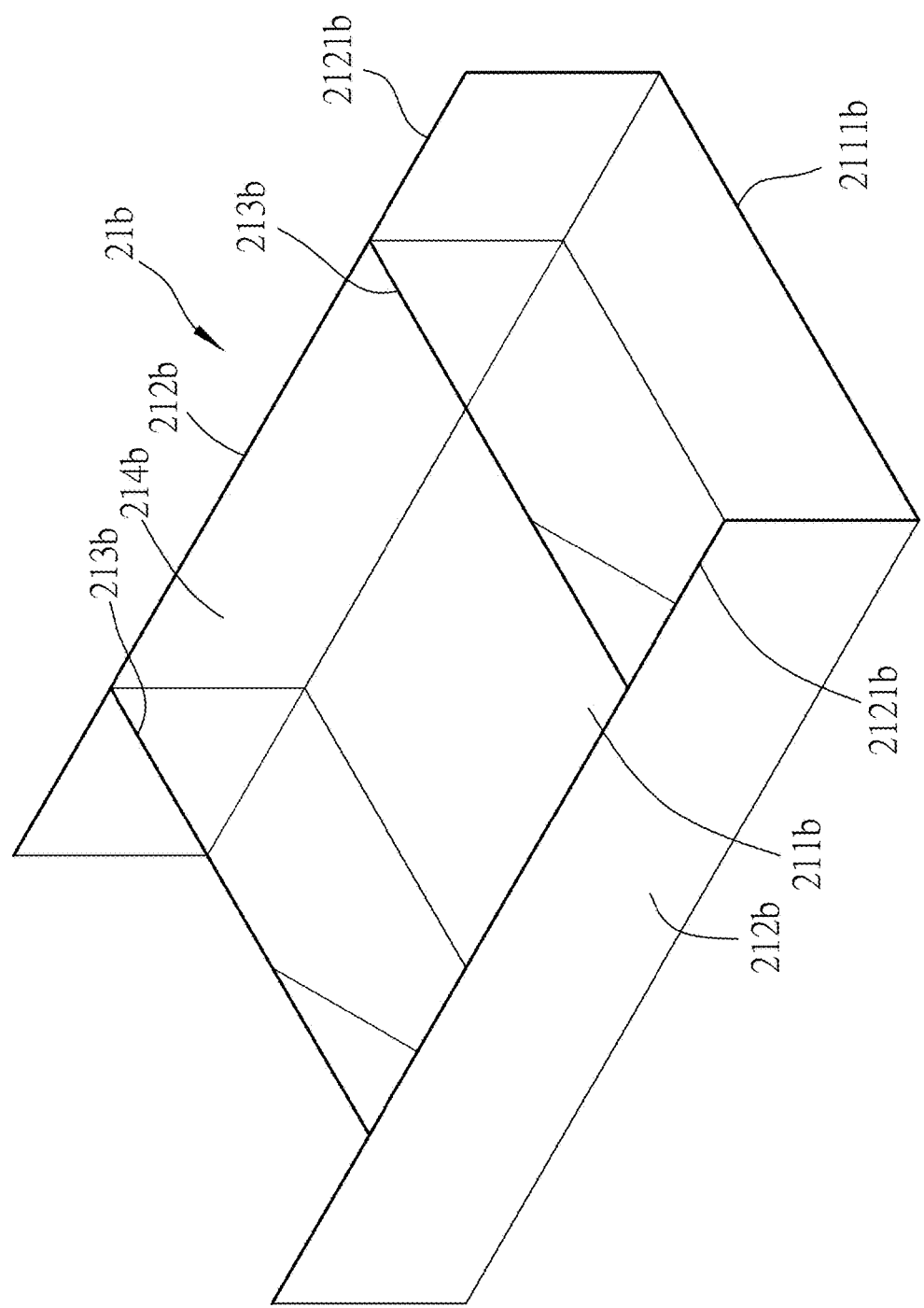
FIG. 28 is a perspective view of an open box-like unit of an integrated open box-like woven fabric according to the eighth embodiment of the present disclosure.
Figure 29:
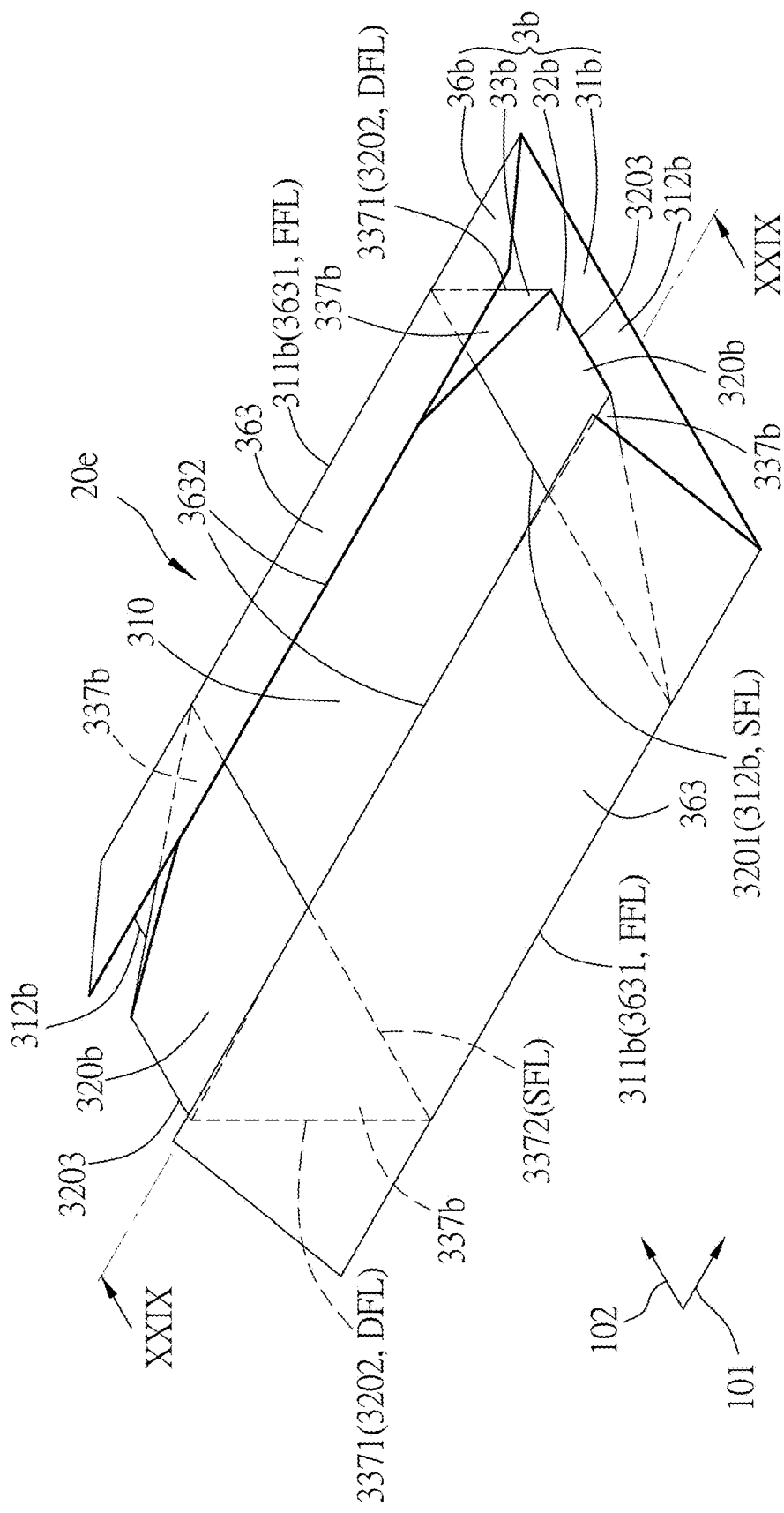
FIG. 29 is a perspective view of a flattened fabric preform used in forming the open box-like unit of the eighth embodiment.
Figure 30:
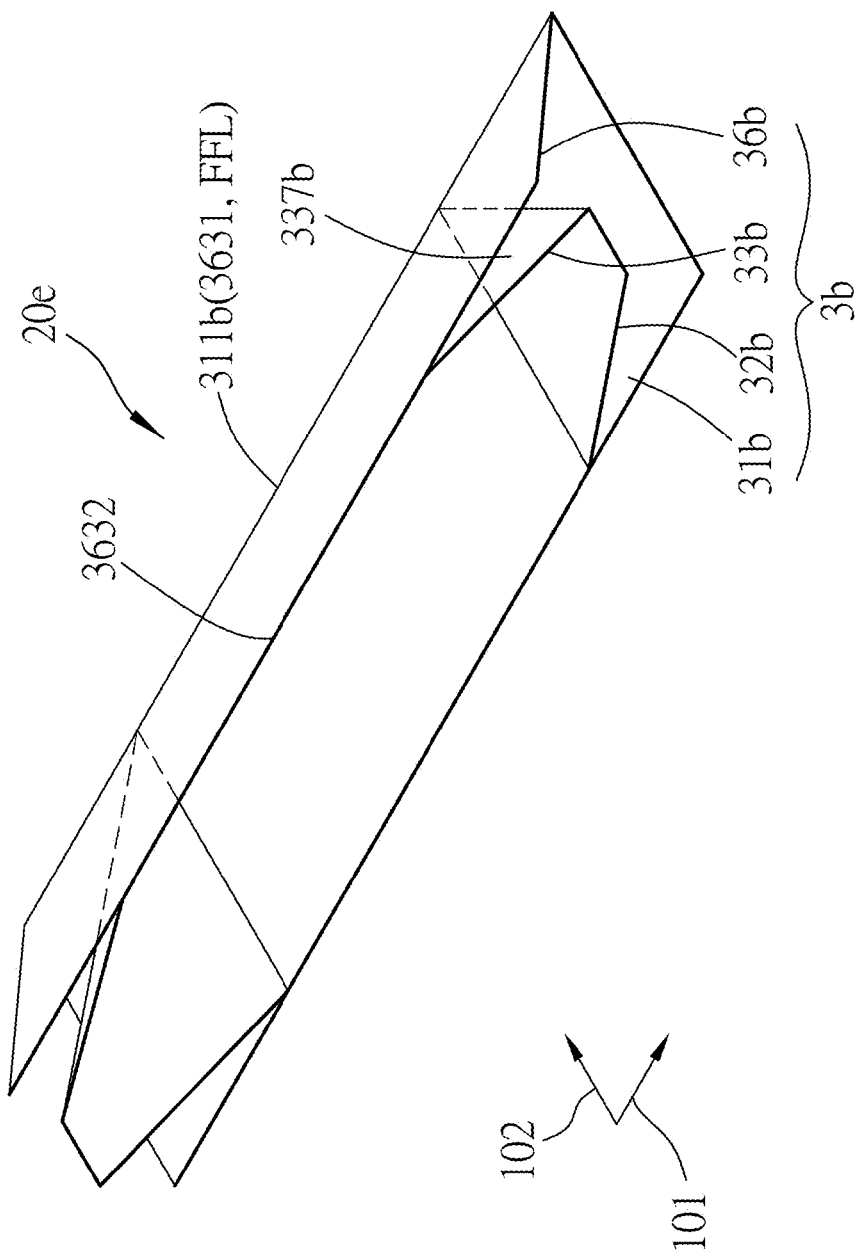
FIG. 30 is a view similar to FIG. 29, but with a portion of the flattened fabric preform being cut off along line XXIX-XXIX of FIG. 29.

Referring to FIGS. 28 to 30, an integrated open box-like woven fabric according to the eighth embodiment of the present disclosure is shown. In this embodiment, the fabric layers (3b) of the flattened fabric preform (20e) include first (bottom), second (intermediate), third (intermediate) and fourth (top) fabric layers (31b, 32b, 33b, 36b) stacked one over the other. The first fabric layer (31b) has two opposite first sides (311b) extending in a first direction 101, two opposite second sides (312b) extending in a second direction 102 transverse to the first direction 101 and interconnecting the first sides (311b), and a four-sided inner area (310b) bordered by the first sides (311b) and distal from the second sides (312b).

The second fabric layer (32b) has two trapezoidal fabric parts (320b) disposed between the first and third fabric layers (31b, 33b) and spaced apart from each other along the first direction 101. Each trapezoidal fabric part (320b) has a long side 3201 extending in the second direction 102, two diagonal sides 3202 that extend convergingly from the long side 3201 along two diagonal directions (A, B), respectively, and that respectively have converging ends opposite to the long side 3201, and a short side 3203 that interconnects the converging ends of the diagonal sides 3202. The diagonal directions (A, B) are angled to the first and second directions 101, 102 and converge toward each other. The long sides 3201 of the trapezoidal fabric parts (320b) are connected to the first fabric layer (31b) by two second folding lines (SFL) that extend along the second direction 102 from one of the first sides (311b) to the other one of the first sides (311b) of the first fabric layer (31b) and that are located between the second sides (312b) thereof to border the four-sided inner area (310b). The short sides 3203 of the trapezoidal fabric parts (320b) are disposed outwardly of the four-sided inner area (310b).

The third fabric layer (33b) has four spaced-apart triangular fabric parts (337b) each interposed between one of the four-sided fabric parts 363 of the fourth fabric layer (36b) and one of the trapezoidal fabric parts (320b) of the second fabric layer (32b). Each of the triangular fabric parts (337b) has a first side 3371 connected to one of the diagonal sides 3202 of one of the trapezoidal fabric parts (320b) by a diagonal folding line (DFL) extending along one of the diagonal directions (A, B), and a second side 3372 connected to one end of the first side 3371.

The fourth fabric layer (36b) has a pair of four-sided fabric parts 363 which are spaced apart from each other along the second direction 102. Each of the four-sided fabric parts 363 has outer and inner sides 3631, 3632 both of which extend in the first direction 101. The outer sides 3631 of the four-sided fabric parts 363 are respectively connected to the first sides (311b) of the first fabric layer (31b) by two first folding lines (FFL) extending in the first direction 101, while the inner sides 3632 thereof are spaced apart from each other and are disposed between the outer sides 3631. The second side 3372 of each triangular fabric part (337b) is further connected to one of the four-sided fabric parts 363 by another second folding line (SFL) extending along the second direction 102.

The flattened fabric preform (20e) may be fabricated by arranging the first yarns (FY) at four yarn levels for use as warp yarns and by using the second yarns (SY) as weft yarns to interweave with the first yarns (FY).

When the fabric layers (3b) of the flattened fabric preform (20e) are unfolded, the four-sided inner area (310b) of the first fabric layer (31b) form the base wall (211b), two areas of the first fabric layer (31b) outside of the four-sided inner area (310b) and adjacent to the long sides 3201 of the trapezoidal fabric parts (320b) form the bottom extensions (2111b), the four-sided fabric parts 363 of the fourth fabric layer (36b) form the outer walls (212b) and the side extensions (2121b) of the open box-like unit (21b), and the triangular and trapezoidal fabric parts (337b, 320b) form the inner walls (213b). A top opening (214b) is formed between the outer walls (212b) and between the inner walls (213b).

Figure 31:
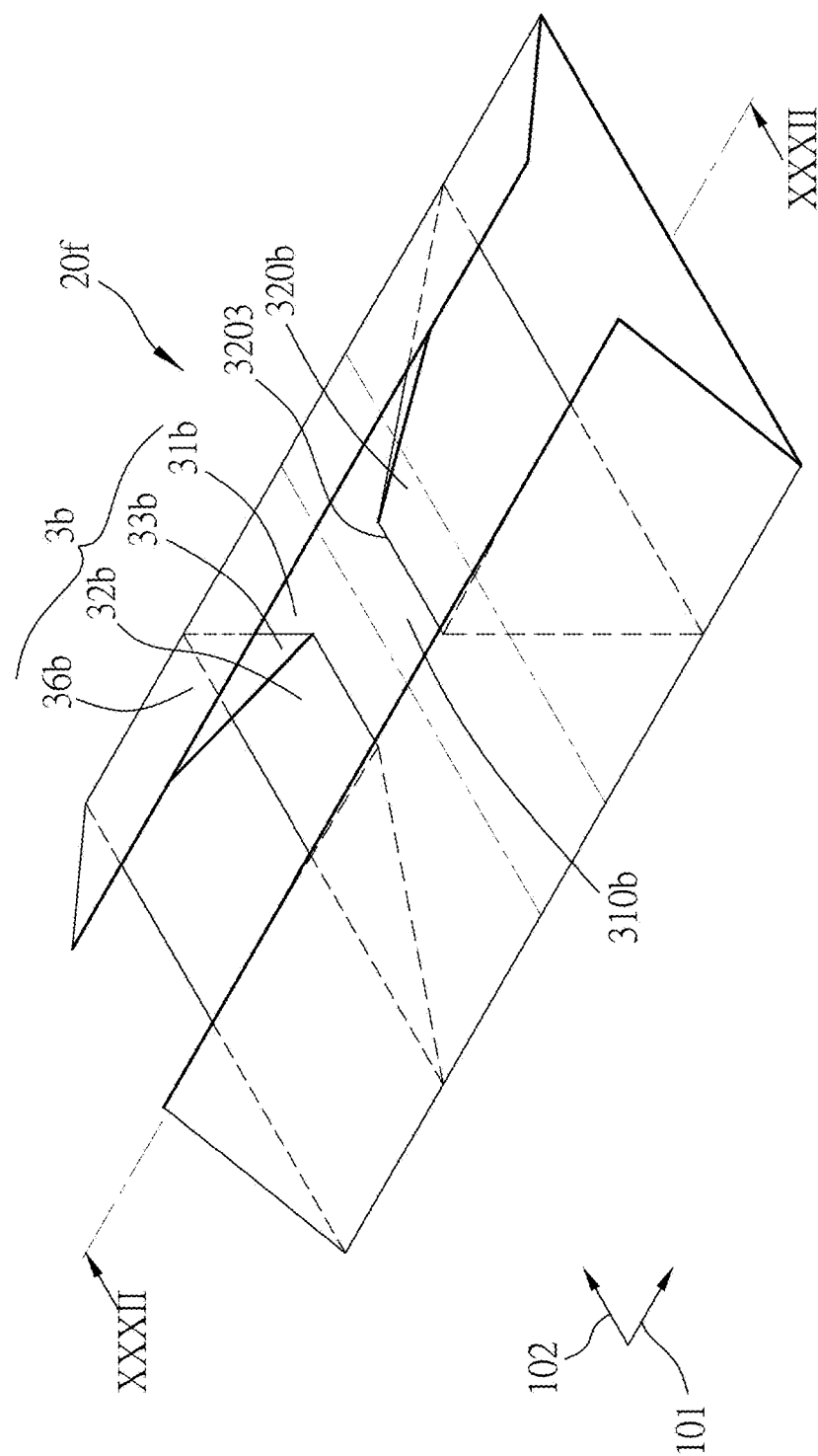
FIG. 31 is a perspective view of a flattened fabric preform used in forming an open box-like unit of an integrated open box-like woven fabric according to the ninth embodiment of the present disclosure.
Figure 32:
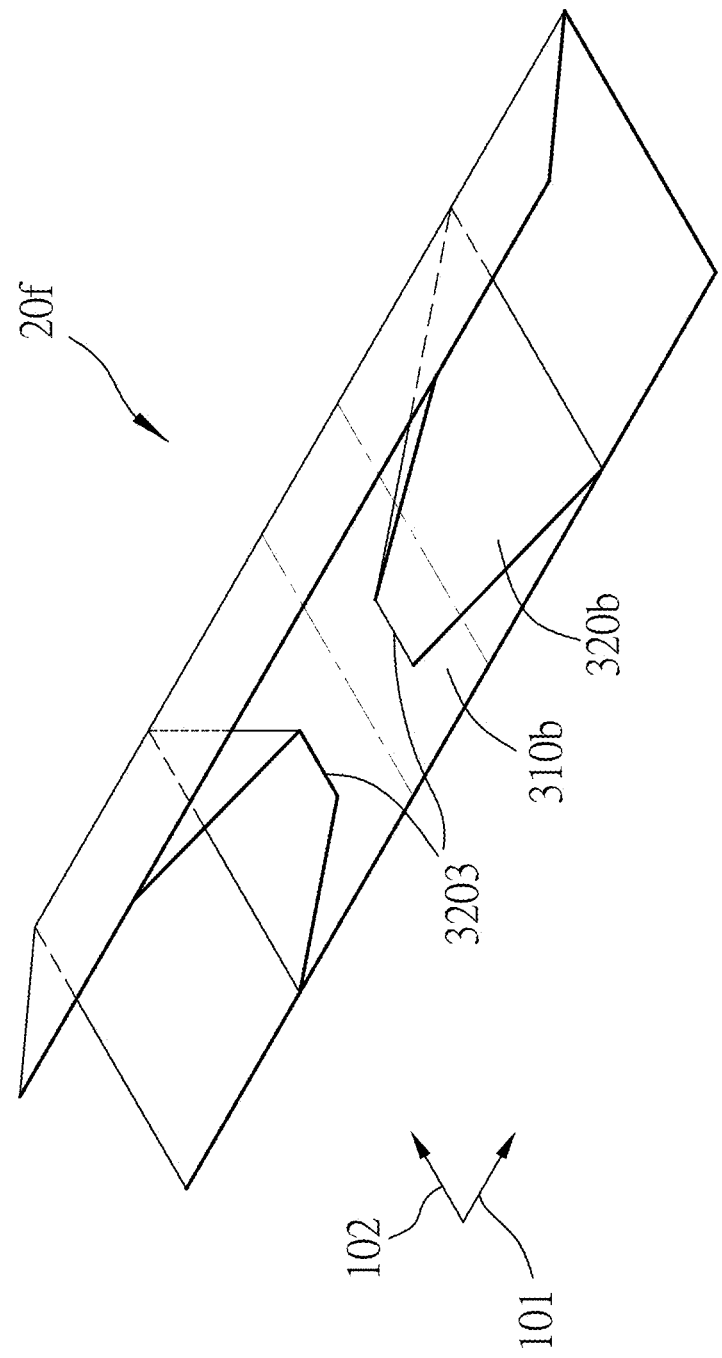
FIG. 32 is a view similar to FIG. 31, but with a portion of the flattened fabric preform being cut off along line XXXII-XXXII of FIG. 31.

Referring to FIGS. 31 and 32, an integrated open box-like woven fabric according to the ninth embodiment of the present disclosure is shown to be similar to the eighth embodiment. However, in this embodiment, the short sides 3203 of the trapezoidal fabric parts (320b) of the second fabric layer (32b) of the flattened fabric preform (20f) are disposed over the four-sided inner area (310b).

Figure 33:
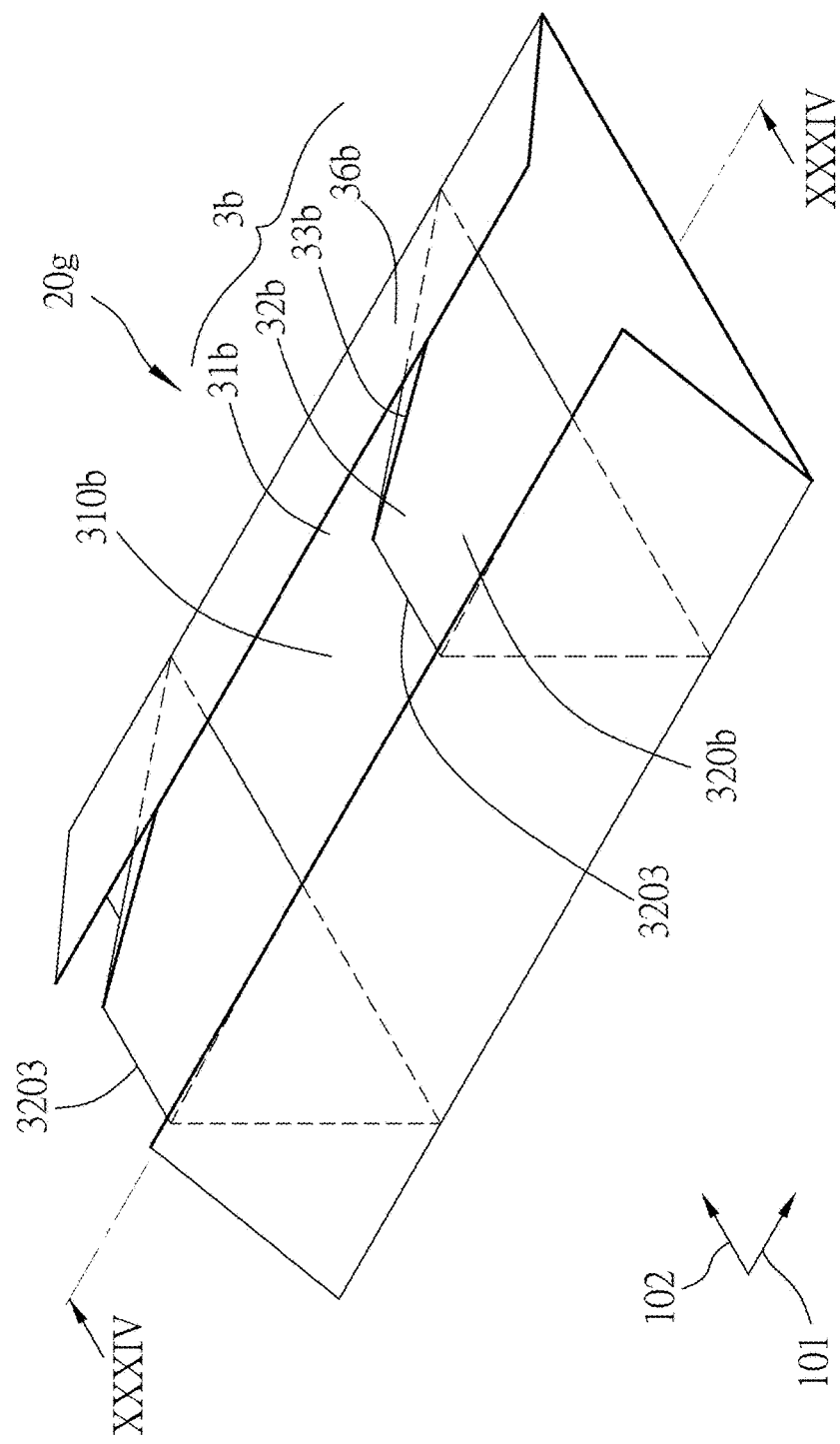
FIG. 33 is a perspective view of a flattened fabric preform used in forming an open box-like unit of an integrated open box-like woven fabric according to the tenth embodiment of the present disclosure.
Figure 34:
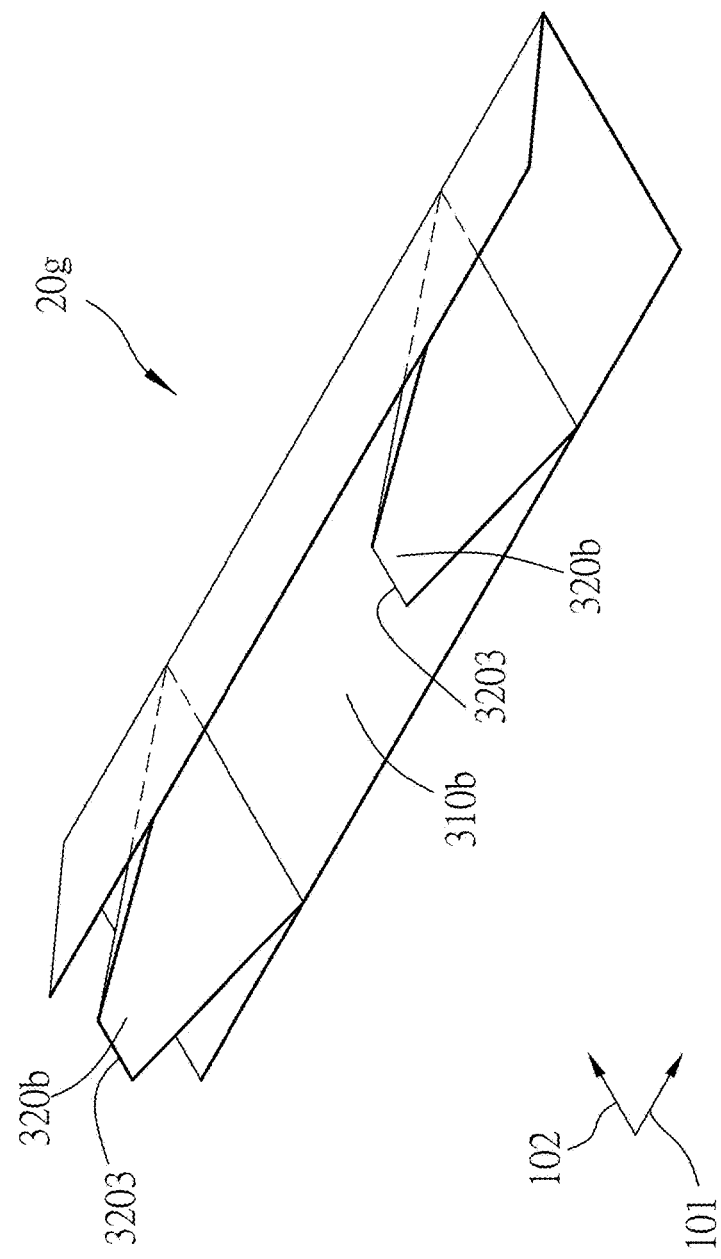
FIG. 34 is a view similar to FIG. 33, but with a portion of the flattened fabric preform being cut off along line XXXIV-XXXIV of FIG. 33.

Referring to FIGS. 33 and 34, an integrated open box-like woven fabric according to the tenth embodiment of the present disclosure is shown to be similar to the eighth embodiment. However, in this embodiment, the short side 3203 of one of the trapezoidal fabric parts (320b) of the second fabric layer (32b) of the flattened fabric preform (20g) is disposed outwardly of the four-sided inner area (310b), and the short side 3203 of the other trapezoidal fabric part (320b) is disposed over the four-sided inner area (310b).

As described hereinbefore, in all of the embodiments, the first folding lines (FFL) extend along the first or warp direction, the second folding lines (SFL) extend along the second or weft direction that is perpendicular to the first direction, and the diagonal folding lines (DFL) extend along diagonal directions that are angled to both of the first and second directions. However, the disclosure should not be limited only to the embodiments. According to other embodiments, the first folding lines (FFL) may not be perpendicular to the second folding lines (SFL). The first folding lines (FFL) may not extend along the direction of the weft or warp yarn. Similarly, the second folding lines (SFL) may not extend along the direction of the weft or warp yarn. In addition, the first folding lines (FFL) are not necessarily parallel to each other, and the second folding lines (SFL) are not necessarily parallel to each other.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the present disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An integrated open box-like woven fabric comprising:
an open box-like unit including two outer walls, at least two spaced-apart inner walls connected transversely between said outer walls, at least one top opening formed between said outer walls and between said at least two inner walls, and a base wall connected to said outer and inner walls oppositely of said top opening, each of said outer walls having at least one side extension extending outwardly from a junction of said outer wall and a corresponding one of said inner walls, said base wall having at least one bottom extension extending outwardly from a junction of said base wall and the corresponding one of said inner walls, said at least one side extension of each of said outer walls forming one corner with said at least one bottom extension and with the corresponding one of said inner walls, said open box-like unit being formed from a flattened fabric preform, which includes a plurality of first yarns arranged at different levels, and a plurality of second yarns interwoven with said first yarns to form a plurality of fabric layers that are foldably/unfoldably connected to each other;
said fabric layers including two first fabric layers, at least one pair of second fabric layers disposed between said first fabric layers, and at least one third fabric layer disposed adjacent at least one of said first fabric layers oppositely of said second fabric layers;
each of said first fabric layers having two opposite first sides, two opposite second sides that respectively connect to and converge from said first sides and that respectively have converging ends opposite to said first sides, and diverging ends connected to said first sides, and a third side connected between said converging ends of said second sides;
said at least one third fabric layer having two opposite fourth sides, that respectively have converging ends and diverging ends, and that are connected to said at least one of said first fabric layers;
each of said second fabric layers having two opposite fifth sides and that respectively have converging ends and diverging ends;
said second sides of each of said first fabric layers being respectively connected to said fifth sides of an adjacent one of said second fabric layers by two diagonal folding lines, said first sides of each of said first fabric layers being respectively connected to said diverging ends of said fifth sides of the adjacent one of said second fabric layers, and said third side of each of said first fabric layers being connected to said converging ends of said fifth sides of the adjacent one of said second fabric layers; and
said first and second fabric layers being used to form said outer, inner and base walls of said open box-like unit, said at least one third fabric layer being used to form said at least one side and bottom extensions of said open box-like unit.

2. The integrated open box-like woven fabric as claimed in claim 1, wherein said at least one third fabric layer further has two opposite sixth sides that are respectively connected to said diverging ends of said fourth sides, and a seventh side interconnecting said sixth sides oppositely of said fourth sides, said converging ends of said fourth sides converging to a point opposite to said seventh side, said at least one third fabric layer further having a four-sided area bordered by said sixth sides and said seventh side, a triangular area adjoining said four-sided area and bordered by said fourth sides, and a separation line that extends from said point to said seventh side to separate each of said four-sided area and said triangular area into two separated parts, said at least one of said first fabric layers immediately underlying said four-sided area of said at least one third fabric layer, said fabric layers further including at least one triangular fabric layer foldably/unfoldably connected to and immediately underlying said triangular area of said at least one third fabric layer, wherein, when said at least one third fabric layer is separated along said separation line, pulled outwardly and unfolded, said at least one triangular fabric layer cooperates with said separated parts of said four-sided and triangular areas of said at least one third fabric layer to form said at least one bottom extension.

3. The integrated open box-like woven fabric as claimed in claim 1, wherein each of said second fabric layers has a single trapezoidal fabric part that has said two fifth sides, and further has an eighth side connected between said converging ends of said fifth sides, said first sides of each of said first fabric layers being respectively connected to said first sides of the other one of said first fabric layers by two first folding lines, said third side of each of said first fabric layers being connected to said eighth side of the adjacent one of said second fabric layers by a second folding line between said converging ends of said fifth sides, each of said second fabric layers being connected to the other one of said second fabric layers by another second folding line between said diverging ends of said fifth sides, wherein, when said fabric layers are unfolded, said first fabric layers form said outer and inner walls of said open box-like unit, and said second fabric layers form said base wall.

4. The integrated open box-like woven fabric as claimed in claim 1, wherein each of said second fabric layers has two fabric parts, each of which has one of said fifth sides, a ninth side, and a tenth side, said ninth sides of said two fabric parts being respectively connected to said diverging ends of said fifth sides, said tenth sides of said two fabric parts being respectively connected to said converging ends of said fifth sides and disposed between said ninth sides, said first sides of each of said first fabric layers being respectively connected to said ninth sides of said two fabric parts of an adjacent one of said second fabric layers by two first folding lines, said fifth sides of said two fabric parts of each of said second fabric layers being respectively connected to said second sides of the adjacent one of said first fabric layers by said two diagonal folding lines, said tenth sides of said two fabric parts of each of said second fabric layers being respectively connected to said tenth sides of said two fabric parts of the other one of said second fabric layers by another two first folding lines located between said two first folding lines, wherein, when said fabric layers are unfolded relative to each other, said first fabric layers form said inner walls of said open box-like unit, and said second fabric layers form said outer and base walls.

5. The integrated open box-like woven fabric as claimed in claim 1, wherein said at least one third fabric layer is trapezoidal and further has an eleventh side that is connected between said diverging ends of said fourth sides, and a twelfth side that is connected between said converging ends of said fourth sides, said twelfth side of said at least one third fabric layer being connected to said third side of said at least one of said first fabric layers wherein, when said eleventh sides of said third fabric layers are pulled outwardly and unfolded, said at least one third fabric layer forms said bottom extension.

6. The integrated open box-like woven fabric as claimed in claim 1, wherein said at least two inner walls includes more than two inner walls, said at least one top opening including a plurality of top openings, said at least one pair of second fabric layers including a plurality of pairs of second fabric layers, said fabric layers further including at least one fourth fabric layer disposed between and connected foldably/unfoldably to two adjacent pairs of said second fabric layers for being used to form one of said more than two inner walls.

7. The integrated open box-like woven fabric as claimed in claim 6, wherein each of said second fabric layers has a single trapezoidal fabric part that has said two fifth sides, said trapezoidal fabric parts of each pair of said second fabric layers being connected to one another by a second folding line between said diverging ends of said fifth sides, said at least one fourth fabric layer having a mid-portion, and two opposite end portions connected to two opposite sides of said mid-portion, each of said opposite end portions being bifurcated to form two branching parts.

8. An integrated open box-like woven fabric comprising:
an open box-like unit including two outer walls, two spaced-apart inner walls connected transversely between said outer walls, a top opening formed between said outer walls and between said inner walls, and a base wall connected to said outer and inner walls oppositely of said top opening, each of said outer walls having two side extensions each extending outwardly from a junction of said outer wall and a corresponding one of said inner walls, said base wall having two bottom extensions each extending outwardly from a junction of said base wall and the corresponding one of said inner walls, each of said side extensions forming one corner with one of said bottom extension and with one of said inner walls, said open box-like unit being formed from a flattened fabric preform, which includes
a plurality of first yarns arranged at different levels, and a plurality of second yarns interwoven with said first yarns to form a plurality of fabric layers that are foldably/unfoldably connected to each other;
said fabric layers including a first fabric layer, a second fabric layer, and a third fabric layer stacked one over the other;
said first fabric layer having a four-sided inner area, a pair of first diagonal sides, and a pair of second diagonal sides, said four-sided inner area having four corners, said first and second diagonal sides extending around said four-sided inner area in an alternating manner and respectively contacting said four corners, two adjacent ones of said first and second diagonal sides extending convergingly toward each other and respectively having converging ends extending outwardly of said four-sided inner area;
said third fabric layer having four spaced-apart triangular fabric parts each of which has a third diagonal side connected to one of said first and second diagonal sides by a diagonal folding line, a first side, and a second side connected to said first side and said third diagonal side; and
said second fabric layer having two non-triangular fabric parts each of which has two opposite first sides respectively connected to two adjacent ones of said triangular fabric parts by two first folding lines, and a second side that interconnects said first sides of said second fabric layer and that is connected to said first fabric layer by a second folding line between two of said corners of said four-sided inner area.

9. An integrated open box-like woven fabric comprising:
an open box-like unit including two outer walls, two spaced-apart inner walls connected transversely between said outer walls, a top opening formed between said outer walls and between said inner walls, and a base wall connected to said outer and inner walls oppositely of said top opening, each of said outer walls having two side extensions each extending outwardly from a junction of said outer wall and a corresponding one of said inner walls, said base wall having two bottom extensions each extending outwardly from a junction of said base wall and the corresponding one of said inner walls, each of said side extensions of each of said outer walls forming one corner with one of said bottom extensions and with one of said inner walls, said open box-like unit being formed from a flattened fabric preform, which includes:
a plurality of first yarns arranged at different levels, and a plurality of second yarns interwoven with said first yarns to form a plurality of fabric layers that are foldably/unfoldably connected to each other;
said fabric layers including a first fabric layer, a second fabric layer, a third fabric layer and a fourth fabric layer stacked one over the other;
said first fabric layer having two opposite first sides, two opposite second sides interconnecting said first sides, and a four-sided inner area bordered by said first sides and distal from said second sides;
said fourth fabric layer having a pair of four-sided fabric parts which are spaced apart from each other and each of which has outer and inner sides, said outer sides of said four-sided fabric parts being respectively connected to said first sides of said first fabric layer by two first folding lines, said inner sides of said four-sided fabric parts being spaced apart from each other and disposed between said outer sides;
said second fabric layer having two trapezoidal fabric parts disposed between said first and third fabric layers and spaced apart from each other, each of said trapezoidal fabric parts having a long side, two diagonal sides that extend convergingly from two opposite ends of said long side and that respectively have converging ends opposite to said long side, and a short side that interconnects said converging ends of said diagonal sides, said long sides of said two trapezoidal fabric parts being connected to said first fabric layer by two second folding lines that extend from one of said first sides to the other one of said first sides of said first fabric layer and that are located between said second sides of said first fabric layer to border said four-sided inner area;
said third fabric layer having four spaced-apart triangular fabric parts each interposed between one of said four-sided fabric parts and one of said trapezoidal fabric parts, each of said triangular fabric parts being connected to one of said diagonal sides of one of said trapezoidal fabric parts by a diagonal folding line, and being further connected to one of said four-sided fabric parts of said fourth fabric layer by another second folding line;
wherein said four-sided inner area of said first fabric layer forms said base wall of said open box-like unit, two areas of said first fabric layer outside of said four-sided inner area and adjacent to said long sides of said trapezoidal fabric parts form said bottom extensions, said four-sided fabric parts of said fourth fabric layer form said outer walls and said side extensions, and said triangular and trapezoidal fabric parts form said inner walls.

* * * * *